United States Patent
Khafizova

(10) Patent No.: US 9,639,305 B1
(45) Date of Patent: *May 2, 2017

(54) METHOD AND APPARATUS OF PROCESSING INFORMATION IN AN ENVIRONMENT WITH MULTIPLE DEVICES AND RESOURCES

(71) Applicant: OPEN INVENTION NETWORK LLC, Durham, NC (US)

(72) Inventor: Margarita Khafizova, Plano, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,843

(22) Filed: Dec. 16, 2015

Related U.S. Application Data

(63) Continuation of application No. 12/753,171, filed on Apr. 2, 2010, now Pat. No. 9,223,529.

(60) Provisional application No. 61/317,741, filed on Mar. 26, 2010, provisional application No. 61/317,744, filed on Mar. 26, 2010, provisional application No. 61/317,827, filed on Mar. 26, 2010, provisional application No. 61/317,800, filed on Mar. 26, 2010, provisional application No. 61/317,812, filed on Mar. 26, 2010, provisional application No. 61/317,793, filed on Mar. 26, 2010.

(51) Int. Cl.
*G06F 3/12* (2006.01)

(52) U.S. Cl.
CPC .......... *G06F 3/1226* (2013.01); *G06F 3/1205* (2013.01); *G06F 3/1263* (2013.01); *G06F 3/1286* (2013.01); *G06F 3/1287* (2013.01); *G06F 3/1288* (2013.01); *G06F 3/1291* (2013.01); *G06F 3/1292* (2013.01); *G06F 3/1294* (2013.01)

(58) Field of Classification Search
None
See application file for complete search history.

(56) References Cited

U.S. PATENT DOCUMENTS

| | | | | |
|---|---|---|---|---|
| 5,287,194 A | * | 2/1994 | Lobiondo | G03G 15/5083 358/1.15 |
| 6,157,465 A | * | 12/2000 | Suda | G06F 3/1204 358/1.15 |
| 6,348,971 B2 | * | 2/2002 | Owa | G06F 3/1204 358/1.1 |

(Continued)

*Primary Examiner* — Ted Barnes
(74) *Attorney, Agent, or Firm* — Haynes and Boone, LLP

(57) ABSTRACT

A method and apparatus are disclosed that provide processing data associated with a job request. In one example, the job request may be a printer job to print a particular document based on predefined settings. The data processing operation may include determining at least one job specific resource available to fulfill the job request, and performing at least one of a prioritization computation, a job specific requirement computation, and a geographical determination computation. Additional operations may include selecting at least one appropriate device to fulfill the job request based on the at least one computation operation and the at least one available job specific resource, and processing and completing the job using the at least one appropriate device based on the at least one computation.

20 Claims, 17 Drawing Sheets

(56) References Cited

U.S. PATENT DOCUMENTS

| | | | | |
|---|---|---|---|---|
| 6,659,662 B2* | 12/2003 | Grohs | G06Q 10/04 | 358/1.15 |
| 6,762,852 B1* | 7/2004 | Fischer | G06F 3/1204 | 358/1.13 |
| 7,081,969 B1* | 7/2006 | Motamed | G06F 3/1208 | 358/1.15 |
| 7,884,954 B2* | 2/2011 | Endoh | G06F 21/84 | 358/1.1 |
| 7,949,740 B2* | 5/2011 | Scrafford | G06F 11/0733 | 358/1.15 |
| 8,134,724 B2* | 3/2012 | Kephart | G06Q 30/0261 | 358/1.1 |
| 8,149,441 B2* | 4/2012 | Bouchard | G06Q 10/10 | 358/1.13 |
| 8,164,785 B2* | 4/2012 | Ferlitsch | G06F 3/1211 | 358/1.15 |
| 8,305,602 B2* | 11/2012 | Ferlitsch | H04L 67/16 | 358/1.13 |
| 8,559,036 B1* | 10/2013 | Khafizova | G06F 3/1204 | 358/1.13 |
| 8,724,154 B1* | 5/2014 | Khafizova | G06F 3/1204 | 358/1.13 |
| 9,189,191 B1* | 11/2015 | Khafizova | G06F 3/1204 | |
| 9,223,529 B1* | 12/2015 | Khafizova | G06F 3/1204 | |
| 9,235,645 B1* | 1/2016 | Khafizova | G06F 17/30867 | |
| 2001/0013053 A1* | 8/2001 | Yamazaki | G06F 3/1205 | 709/203 |
| 2003/0011805 A1* | 1/2003 | Yacoub | G06F 3/1204 | 358/1.15 |
| 2003/0117638 A1* | 6/2003 | Ferlitsch | G06F 3/1204 | 358/1.13 |
| 2003/0142016 A1* | 7/2003 | Pickup | G01S 1/047 | 342/387 |
| 2003/0174356 A1* | 9/2003 | Cherry | G06Q 30/04 | 358/1.15 |
| 2003/0198337 A1* | 10/2003 | Lenard | G06Q 10/06 | 379/265.14 |
| 2004/0061890 A1* | 4/2004 | Ferlitsch | G06F 3/1205 | 358/1.15 |
| 2004/0137855 A1* | 7/2004 | Wiley | G06F 3/1204 | 455/88 |
| 2005/0088681 A1* | 4/2005 | Hosoda | G06F 3/1204 | 358/1.14 |
| 2005/0102442 A1* | 5/2005 | Ferlitsch | G06F 3/1204 | 710/15 |
| 2005/0128968 A1* | 6/2005 | Yang | H04W 48/16 | 370/312 |
| 2005/0270564 A1* | 12/2005 | Yun | G06Q 30/00 | 358/1.15 |
| 2005/0275852 A1* | 12/2005 | Ferlitsch | G06F 3/1211 | 358/1.6 |
| 2006/0039026 A1* | 2/2006 | Lofthus | H04N 1/00954 | 358/1.15 |
| 2006/0244991 A1* | 11/2006 | Tenger | G06F 3/1261 | 358/1.15 |
| 2006/0268318 A1* | 11/2006 | Lofthus | G06F 3/1208 | 358/1.15 |
| 2007/0061474 A1* | 3/2007 | Quach | G06F 3/1208 | 709/229 |
| 2007/0086052 A1* | 4/2007 | Furuya | H04L 67/16 | 358/1.15 |
| 2007/0124436 A1* | 5/2007 | Shepherd | G06F 3/1226 | 709/223 |
| 2007/0165266 A1* | 7/2007 | Tian | G06F 3/1212 | 358/1.15 |
| 2007/0198755 A1* | 8/2007 | Honda | G06F 3/1207 | 710/36 |
| 2007/0201077 A1* | 8/2007 | Morales | G06F 3/1214 | 358/1.15 |
| 2007/0201078 A1* | 8/2007 | Morales | G06F 3/1213 | 358/1.15 |
| 2007/0229891 A1* | 10/2007 | Yanagi | H04L 67/18 | 358/1.15 |
| 2007/0285714 A1* | 12/2007 | Hirayama | G06Q 30/02 | 358/1.15 |
| 2008/0013109 A1* | 1/2008 | Chen | G06K 15/02 | 358/1.1 |
| 2008/0225326 A1* | 9/2008 | Kephart | G06Q 30/0261 | 358/1.15 |
| 2008/0246986 A1* | 10/2008 | Scrafford | H04L 41/12 | 358/1.15 |
| 2008/0246988 A1* | 10/2008 | Ashton | G06F 3/1204 | 358/1.15 |
| 2008/0259381 A1* | 10/2008 | Jang | G03G 21/02 | 358/1.15 |
| 2008/0273224 A1* | 11/2008 | Maulsby | G06Q 10/10 | 358/1.15 |
| 2009/0046319 A1* | 2/2009 | Fukusada | G06F 3/1285 | 358/1.15 |
| 2009/0077164 A1* | 3/2009 | Phillips | G06Q 10/06 | 709/203 |
| 2009/0158287 A1* | 6/2009 | Cardelli | G06F 9/5038 | 718/102 |
| 2009/0231609 A1* | 9/2009 | Chipchase | G06F 3/1215 | 358/1.15 |
| 2009/0273801 A1* | 11/2009 | Steele | G06F 3/1205 | 358/1.15 |
| 2009/0273808 A1* | 11/2009 | Kohli | H04N 1/00222 | 358/1.15 |
| 2009/0296140 A1* | 12/2009 | Sugiyama | G06F 3/1204 | 358/1.15 |
| 2009/0310160 A1* | 12/2009 | Kai | G06F 3/1222 | 358/1.9 |
| 2010/0053664 A1* | 3/2010 | Mandel | G06F 3/1211 | 358/1.15 |
| 2010/0079805 A1* | 4/2010 | Hashimoto | G06F 21/608 | 358/1.15 |
| 2010/0245885 A1* | 9/2010 | Selvaraj | G06F 3/1205 | 358/1.15 |
| 2010/0315680 A1* | 12/2010 | Ishikake | G06F 3/1208 | 358/1.15 |
| 2011/0026070 A1* | 2/2011 | Kohli | G06F 3/1218 | 358/1.15 |
| 2011/0029443 A1* | 2/2011 | King | G06K 9/228 | 705/310 |
| 2011/0037996 A1* | 2/2011 | DeRoller | G06F 3/1204 | 358/1.15 |
| 2011/0072395 A1* | 3/2011 | King | G06F 17/241 | 715/825 |
| 2011/0170131 A1* | 7/2011 | Kondo | H04N 1/00954 | 358/1.14 |
| 2011/0235090 A1* | 9/2011 | Salgado | G06F 3/1205 | 358/1.15 |
| 2011/0242576 A1* | 10/2011 | Allen | G06F 3/1204 | 358/1.15 |
| 2012/0002241 A1* | 1/2012 | Chatow | G06Q 10/00 | 358/1.15 |

* cited by examiner

COMPLETE NOTIFICATION

METHOD AND APPARATUS OF PROCESSING INFORMATION IN AN ENVIRONMENT WITH MULTIPLE DEVICES AND RESOURCES

CROSS REFERENCE TO RELATED APPLICATIONS

The present patent application is a continuation of patent application Ser. No. 12/753,171, filed Apr. 2, 2010, entitled METHOD AND APPARATUS OF PROCESSING INFORMATION IN AN ENVIRONMENT WITH MULTIPLE DEVICES AND RESOURCES, issued U.S. Pat. No. 9,223,529, issued Dec. 29, 2015, which is related to provisional patent application No. 61/317,741, filed Mar. 26, 2010, entitled System and Method for Analysing Data Records Utilizing a Touch Screen Interface, and provisional patent application No. 61/317,744, filed Mar. 26, 2010, entitled Touch Screen Commands, and provisional patent application No. 61/317,793, filed Mar. 26, 2010, entitled A Method for Touch Detection in Touch Sensitive Screens, and provisional patent application No. 61/317,800, filed Mar. 26, 2010, entitled Touch Sensitive Screens Utilizing History and a Preview, and provisional patent application No. 61/317,812, filed Mar. 26, 2010, entitled Repetitive Touch Combining Method, and provisional patent application No. 61/317,827 filed Mar. 26, 2010, entitled Touch Screen Accuracy, the entire contents of each of these applications are incorporated by reference herein. The instant patent application is related to commonly assigned: patent application Ser. No. 12/753,163, filed Apr. 2, 2010, entitled Systems and Methods for Printing a Document From a Mobile Communication Device, issued U.S. Pat. No. 8,786,875, issued Jul. 22, 2014 and patent application Ser. No. 12/753,167, filed Apr. 2, 2010, entitled Method and Apparatus of Compiling Multimedia Files and Related Data Retrieval Operations, and patent application Ser. No. 12/753,180, filed Apr. 2, 2010, entitled Systems and Methods for Managing the Execution of Print Jobs, issued U.S. Pat. No. 8,559,036, issued Oct. 15, 2013, the entire contents of each of these applications are incorporated by reference herein.

TECHNICAL FIELD OF THE INVENTION

This invention relates to a method and apparatus of providing information processing, such as, printing documents and/or converting audio, video, and multimedia files with computer systems.

BACKGROUND OF THE INVENTION

Computer networking systems that include various data processing elements are essential for processing large amounts of data, and automated processes related to the exchange of information. Examples of tasks related to these data processing activities may include printing documents, converting multimedia files or data streams into a desired data format, and delivering certain data content to a user.

Subsets of video, audio, and multimedia files may be located on the user's computer, the Internet and other data storage locations (i.e., such as websites that specialize in content, for example, Youtube® or Hulu®). The user may desire to convert these files to a different format, size and may also desire to deliver those converted files to a specific network location.

Recent changes made to software tools allow users to produce documents and multimedia files with very specific details tailored to each particular user. For example, individual users may want to have certain files processed (e.g., printed), and the results delivered to a location where the user will be the next day. In large and medium sized organizations, the amount of printed information is substantially large, and often it is necessary to separate documents which must be printed quickly with special requirements (i.e., in color poster format) from those that can be printed at a later time (i.e., black and white data specifications that are not likely to be read at all). Any of these tasks can be accomplished through a number of simple but time consuming operations, which can make the process ineffective. Information processing resources may also be shared (e.g., printing, server applications, etc.) more effectively so that costs are kept to a minimum.

Information processing costs can be estimated by assessing first the cost of processing small subsets of information. For example, when attempting to draw (or print) a complicated shape, it is helpful at first to represent the form with a set of primitive shapes. Almost any form can be represented by some combination of the cube, sphere, cylinder, and cone, which are called drawing primitives. Several types of technologies currently exist that deal with problems related to printing documents.

In one example, a method for analyzing the execution times of drawing primitives may be performed. The method allows the host computer to determine whether the printer connected to the host computer will be able to render drawing primitives in real-time. Additionally, the cost metrics associated with printing drawing primitives are also measured and are used to determine whether such printing of a document can be accomplished in real-time.

However, processing information (i.e., printing) encounters additional challenges when being implemented in a multi-computer environment with shared printing resources. For instance, in a large organization a number of computer users will be sending print jobs to only a few printers available for printing. Each print job generally has unique requirements, such as, time during which the print job must be completed, color quality (e.g., gray scale, black and white, or full color), print size and format, etc. These and other unique requirements make the task of selecting an effective printing strategy a necessary part of optimizing network resources.

Due to the increased cost savings sought by many organizations using printing services, utilizing a method for providing an effective printing computer system is apparent. Similar challenges related to processing and delivering multimedia files to users of network services are also encountered when dealing with larger data networking systems.

SUMMARY OF THE INVENTION

One example embodiment of the present invention may include a method of processing data associated with a job request. The method may include determining at least one job specific resource available to fulfill the job request. The method may also include performing at least one of a prioritization computation, a job specific requirement computation, and a geographical determination computation. The method may further include selecting at least one appropriate device to fulfill the job request based on the at least one computation operation and the at least one available job specific resource, and processing and completing the job using the at least one appropriate device based on the at least one computation.

Another example embodiment of the present invention may include an apparatus configured to process data associated with a job request. The apparatus may include a processor configured to determine at least one job specific resource available to fulfill the job request, to perform at least one of a prioritization computation, a job specific requirement computation, and a geographical determination computation, and to select at least one appropriate device to fulfill the job request based on the at least one computation operation and the at least one available job specific resource. The apparatus may also include a transmitter to transmit the job to the appropriate device, and the appropriate device processes and completes the job based on the at least one computation.

DETAILED DESCRIPTION OF THE INVENTION

Figure 1:
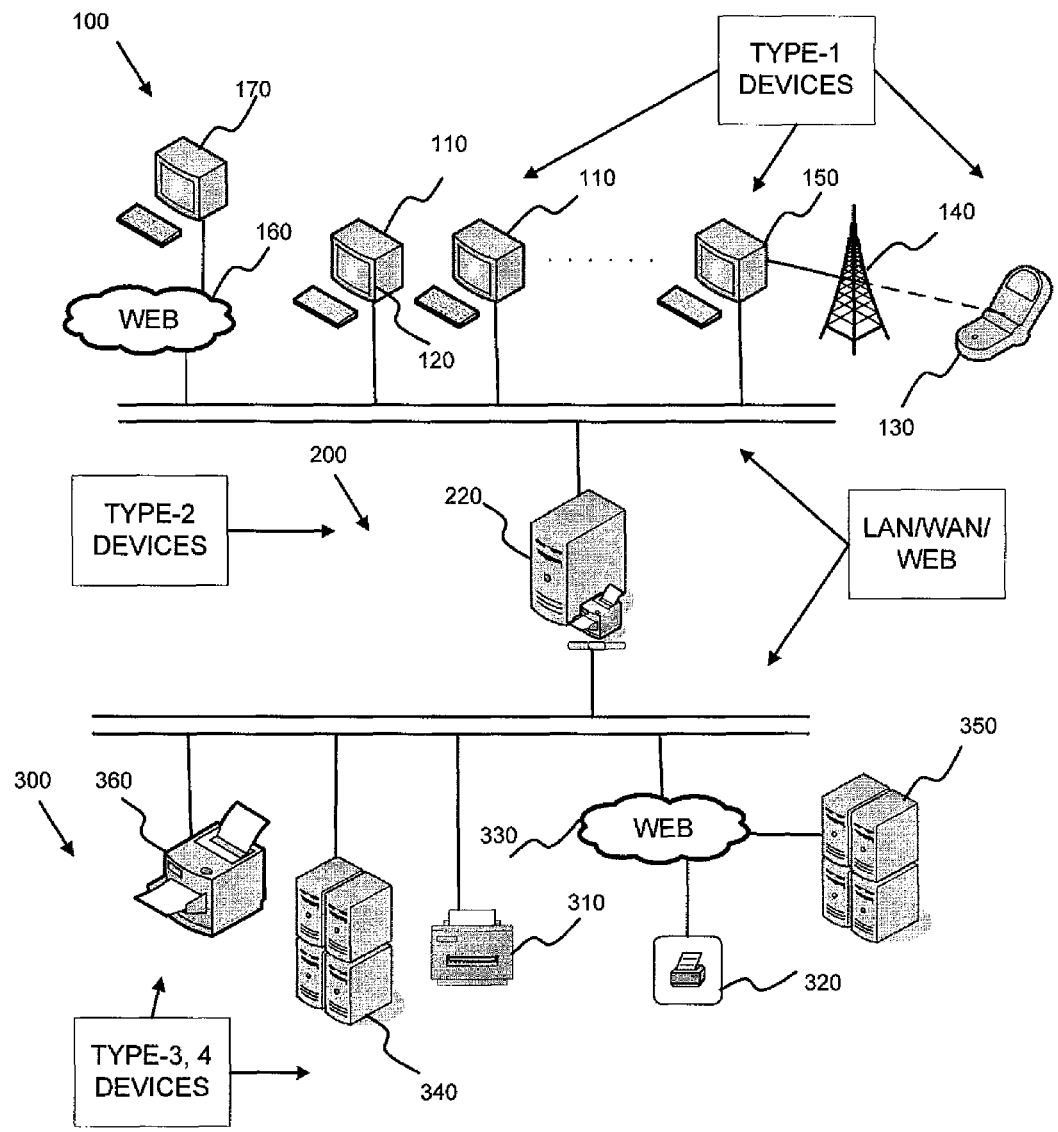
FIG. 1 illustrates an example network configuration according to an example embodiment of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Enclosed is a method, apparatus and computer system addressing certain optimizations in information processing. The examples may be extended to other types of information processing (i.e., other than printing) in similar data networking environments. For example, when there are multiple users competing for limited resources. Some example information processing configurations may include converting media files and/or data streams into files of a specific format and size. User specific information collected from the user during the submission of the information processing request may be used to select a most appropriate server, the order of priority of requests received, etc. Illustrations of such cases are provided in detail below.

Example embodiments may include identification of information processing priorities, and selecting the most optimal processing strategy in the multi-computer (i.e., application server) system with shared limited resources. User input of processing requirements may be provided to the computer system (i.e., application server) through an automated interface. These processing requirements and additional data related to the user may be used to determine information processing priority. An initial selection determination process may provide selecting a device based on specified requirements. Then a target device may be identified based on an estimated processing load so that the total load is shared between the multiple devices to reduce the cumulative processing cost.

The enclosed processing methods are applicable to various types of information processing. Some example processing methods include, but are not limited, to printing documents in a localized networking environment, printing documents at any of a multiple geographical locations, conversion of multimedia files and or data streams into a specified data format, creating an entertainment program from specified media clips, etc.

FIG. 1 illustrates an example of a network connecting various mobile devices, computers, storage devices, and other information processing devices (e.g., printers, application servers, etc.), according to an example embodiment of the present invention. Referring to FIG. 1, the system includes a plurality of devices on a local network 100 that includes type-1 devices. The system also includes a network 200 that includes type-2 device(s), and a network 300 that includes type-3 devices.

Referring to the type-1 device 100, those devices include a user computer (UC) 110, a processor device client software application (PCS) 120 running on the user computer 110, or, on a mobile device 130 communicating to the network via a base station 140. Other type-1 devices include a computer 150 with specialized software on the local network 100, or a computer 170 connected to the local area network through the Internet 160.

The type-2 devices are operating on a separate network 200. Such a network may include a local area network (LAN), wide area network (WAN) or a network located across the web 160 from the network 100. Such a network 200 includes a type-2 device(s), such as, a request processing server (RPS) 220 (i.e., printer request server) which receives print job requests from the type-1 devices (i.e., PCS 110) on the network 100. Upon receiving a request, the RPS 220 includes priority and resource allocation software (PRAS) that is operating on the request processing server (RPS) 220. In addition, the RPS 220 may also include a pool of processors that correspond to a pool of printers 300, or, type-3 devices.

In operation, a particular processor associated with the RPS 220 and the PRAS may perform a selection operation to select a particular printer (i.e., 310) among the type-3 devices to perform a print operation initiated by the user computer 110, that is being selected by the PRAS 220. When a user instructs the PCS application 120 to print a document, the PCS application 120 will automatically read information about the user stored in a user login profile. Additional information may be provided by user input. The PCS application 120 will send all the necessary information and a print job request to a RPS 220 (e.g., printer server). The printer server 220 may be unique and have its own network identity and address. However, the print server 220 may be incorporated into any of a plurality of other computing devices comprising a computer readable storage medium (i.e., memory) and at least one processor. In the event that there are multiple RPSs or print servers 220 operating together in a print server pool, then those print servers 220 may operate together synchronously and may fully share their internal resource management information.

Figure 3A:
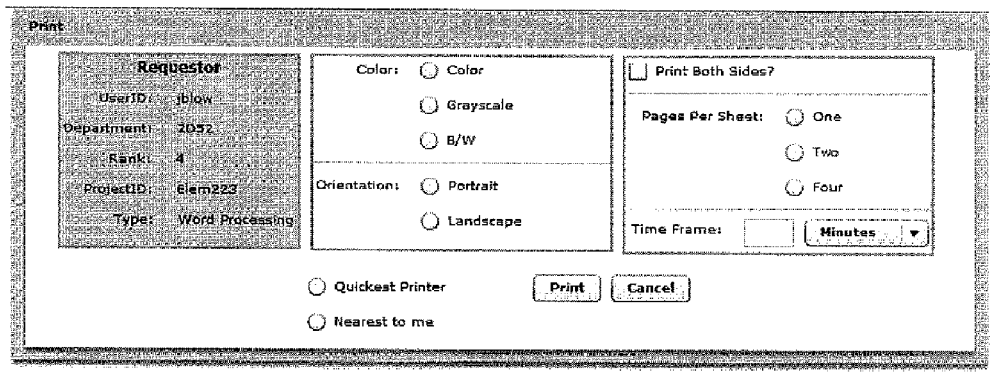
FIGS. 3A-3C illustrate example graphical user interfaces according to an example embodiment of the present invention.

FIG. 3A illustrates a graphical user interface (GUI) representation that the user may observe when requesting a print job, according to an example embodiment of the present invention. Referring to FIG. 3A, the requestor of the print job (i.e., a user associated with the UC 120) may be able to view her own personal information in the first box on the left of the print window. This information may be provided from the system (i.e., the user computer 110), and may be accessed when the requestor of the print job has been identified.

The box in the middle of the GUI and the box on the right of the GUI display illustrate example print options that the user may utilize to setup the options of the print job. Below the boxes, are two more options (i.e., radio buttons) that provide the user with additional options allowing the user to indicate whether the print job is to be sent to the printer that will execute the job the fastest, "Quickest Printer", or the printer that is designated as the nearest to the user's workstation, "Nearest Printer."

The GUI has two additional buttons on the bottom of the GUI to complete the functionality of the print window. The user may select the "Print" button, which will send the print job to the RPS 220, and the window will be removed from the screen. Pressing the "Cancel" button will only remove the window from the screen. The GUI representation reflects an example only of the types of options that are available to the user. One skilled in the art will recognize that there are many different options that may be added to the proposed GUI print window without deviating from the scope of the current invention.

Figure 3B:
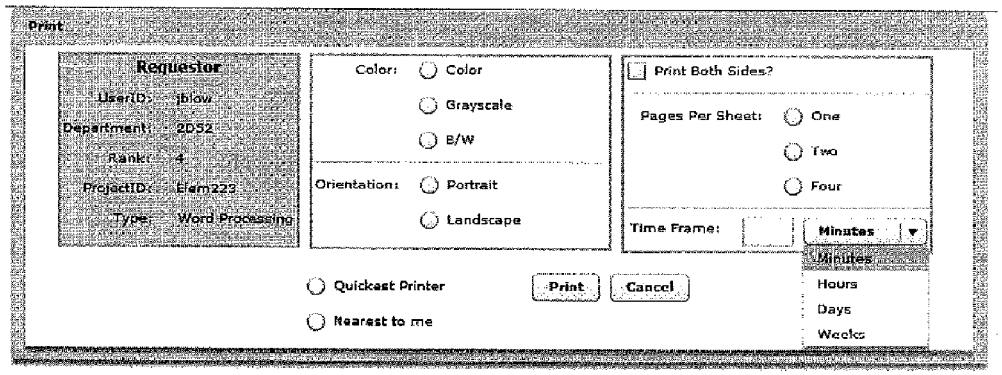

FIG. 3B illustrates another example of the print window, according to an example embodiment of the present invention. In this example, the pull-down "Minute" component of the "Time Frame" option has been selected. This functionality allows the user to select between "Minutes", "Hours", "Days", and "Weeks" when setting the time frame that the user desires to have the print job completed. By offering these additional time frame options, the print server and/or printer devices may be capable of offering increased flexibility and capacity when attempting to prioritize and/or process multiple print jobs.

Figure 3C:
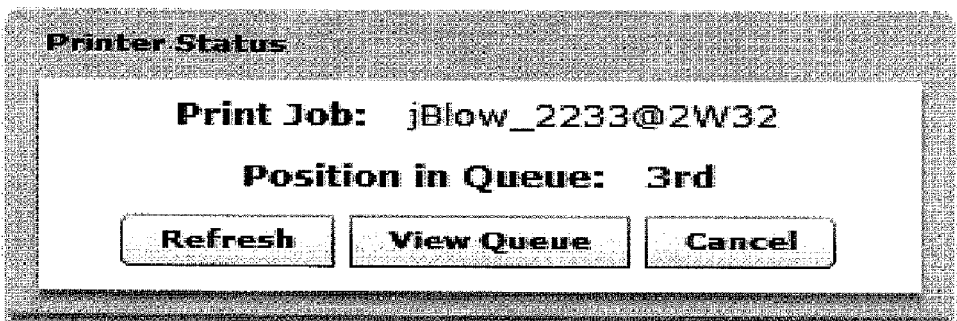

FIG. 3C illustrates another example of the print window, according to an example embodiment of the present invention. In this example, a GUI representation of a "Printer Status" is illustrated as a separate window. Such a window GUI may be displayed after the user has performed the necessary selection operations in the GUI of FIGS. 3A and/or 3B. The window GUI in FIG. 3C may be utilized to display the status of a print job from the RPS 220, once the user has requested a print job. In the window, the print job identifier is displayed in the "Print Job" text field. This identifier may be created by a print server or RPS 220 upon the creation of a requested print job. The next text field depicts a "Position in Queue", which depicts the current queue location of the current print job.

The user may select a "Refresh" button at the bottom of the "Printer Status" window to query the queue from the printer system. The "Position in Queue" will be updated with the current queue location (i.e., "3"). The user may also select the "View Queue" option to send a request to the printer system to display the current queue (not shown). This option will provide the user with details regarding the other print jobs that have been submitted (e.g., number of jobs, file size of jobs, color printing vs. black and white printing jobs, which users have submitted jobs, etc.) The user may instead select the "Cancel" button to remove the window from the display screen.

Figure 2:
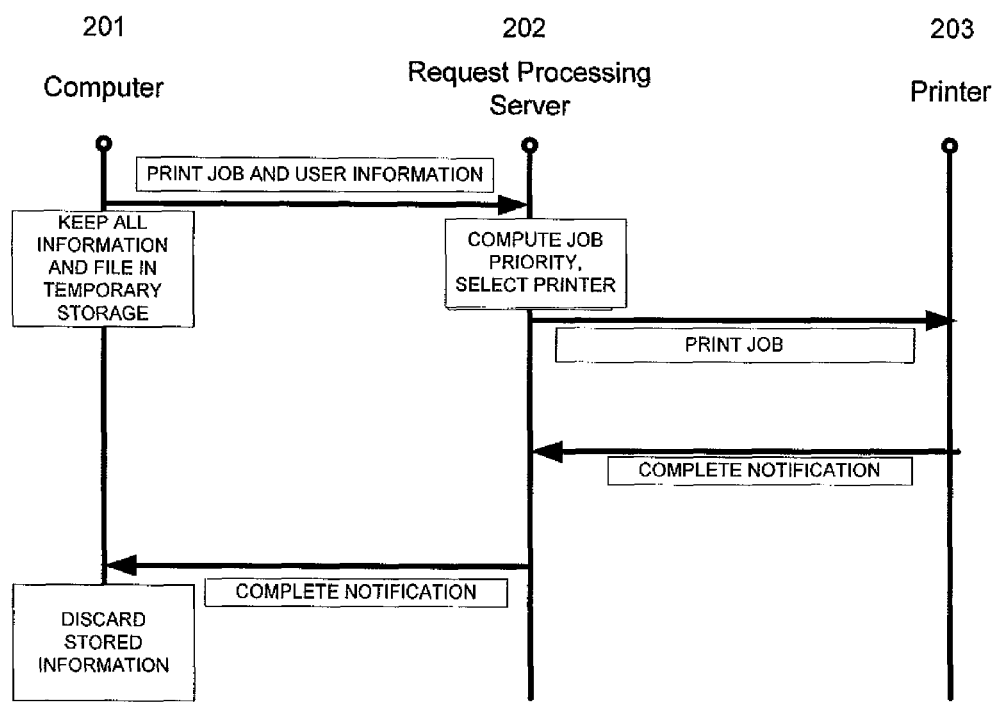
FIG. 2 illustrates an example flow diagram according to an example embodiment of the present invention.
Figure 4:
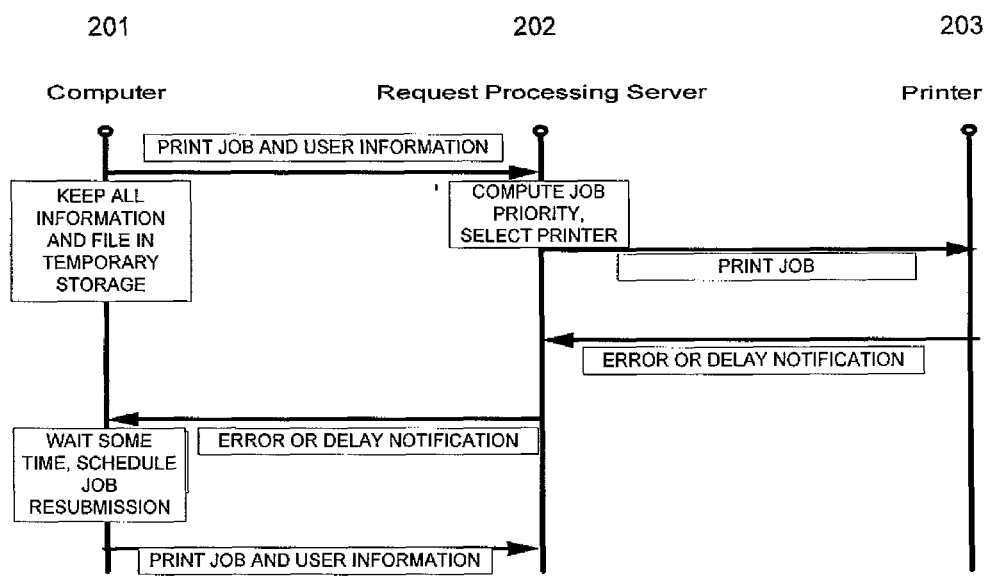
FIG. 4 illustrates another example flow diagram according to an example embodiment of the present invention.

FIGS. 2 and 4 illustrate example processing diagrams that include data message transfers, according to example embodiments of the present invention. Referring to FIG. 2, an example of a successful print job operation being conducted is illustrated. The user's computer 201 may be used to store all print-related information entered by a user or associated with a print job. That print-related information may be saved in a file and stored in a memory storage on a computer readable storage medium of the user's computer 201. Some or all of that information may be transferred to a request processing server 202 during a request for a print job sent from the user's computer 201.

The request processing server 202 will utilize some or all of the information transferred from the user's computer 201 to compute a print job priority and to select a printer appropriate for the job. The request processing server 202 processes the print job information prior to sending the print job to a particular printer 203. As illustrated in FIG. 2, the printer 203 may be limited to providing a simple confirmation completion notification when the print job is successful. Upon a successful print operation, the user's computer 201 may then discard the stored information.

FIG. 4 illustrates a print scenario where the user's submitted print job is not successful after a first attempt. The first few message transfer operations are the same as those illustrated in FIG. 2. However, instead of receiving a completion confirmation from the printer 203, the printer 203 instead transfers an "Error" or "Delay Notification" to the request processing server 202, which, in turn, transfers that message to the computer 201. The user's computer may be setup to automatically wait a predefined amount of time and then resubmit the print request and the user's predefined information to the request processing server 202. The resubmission operation may be performed multiple times until a successful completion notification is received at the user's computer.

Referring to FIG. 1, the processor device client software application (PCS) 120 running on the user computer 110, or, on a mobile device 130 may operate by collecting information which may be split into several different categories. The first information category collected by the PCS 120 may include, for example, a user ID, user department, user rank in the organization, the project that the user is working on, the type of work the user is performing, etc. Typically such information will be stored in a user profile file at the user's computer 110 and/or mobile device 130, which may be automatically retrieved from the PCS 120.

The remaining categories of information may require direct input from the user and may not be predefined user information such as the first information type. Direct input from the user may be accomplished via a command line interface, graphical user interface (GUI), or, via specific times when the PCS application 120 is executed. A second type of information may include, for example, a desired color option (e.g., gray scale, black and white, or full color) of the printed document, layout of the printed document, print options, such as, multiple pages on one page, two-sided print or single-side print, etc. A third category of information may include, for example, a user perceived urgency of print job completion, such as, an expected pick up time (defined by hours, minutes or seconds) after a job submission.

A fourth category of information may include, for example, a type of device that sent the request (i.e., the user's computer, mobile station, etc.), the type of device that received the request, location of the device, etc. In one example of embodiments of the present invention, the device may be identified as a location of the user and his or her proximity to an available pool of printers. For instance, in one embodiment, a location may be identified as one of several zones where each individual zone (i.e., zone-3) corresponds to a certain range or distance (i.e., 10-100 miles) from the RPS 220.

A fifth category of information may include, for example, a preference of a particular printing device selected by the user. Examples may include a laser printer, a color laser printer, an ink-jet printer, a dot-matrix printer, a plotter, etc. The above listed information categories are not exhaustive and may be easily extended to differentiate print job requests based on further alternative attributes.

Complete and/or partial information collected by the user's computer 110 and the related PCS application 120, and the print document or print file including the corresponding print job request information may be sent to the RPS 220. Upon receiving the print file and any print-related information, the RPS 220 may perform various tasks, and, may perform those tasks in parallel. One example, may include a first task executed by the RPS 220 to calculate a priority of the print job sent by the PCS application 120. To calculate the priority, the RPS 220 may execute software which maps each of the data input provided in the information categories one, two, and three to a corresponding numerical value. Next, those numerical values may then be multiplied by a particular weight.

Weights may be either pre-configured, or, they may be dynamically adjusted depending, for example, on the availability of printers that have certain capabilities, the importance of the project being worked on by the user, etc. Then all the multiplied products are summed (and normalized, if necessary) and adjusted (divided) by a cumulative utility factor (CUF) to provide a simply numerical value. The CUF is a fairness enforcement mechanism and is described in detail below. The RPS 220 may utilize the numerical values to perform a print operation. Such a printing operation may be based on a comparison of the priorities of the present print job with other currently pending print jobs currently in the queue.

In order to prevent a single user from continually receiving the highest priority on his/her print service requests a fairness mechanism may be implemented, according to embodiments of the present invention. In operation, the RPS 220 may receive orders (i.e., to process a print job, file transformation, etc.) from various sources, and create a unique identifier (UI) for each user submitting a job request. Each user's UI may be a combination of items including but not limited to a user ID, a job department, a location, etc. These components of the UI may be processed and provided by the PCS 220.

In one example, each user that has submitted at least one job in the last N time periods (where N is a configurable parameter for each RPS 220 that may include one or more minutes, hours, days, weeks, months, years, etc.), the RPS 220 will maintain a record of the number (K) of jobs submitted by the user and their respective priorities. These priority values may be combined into the CUF, which is computed as "1" plus the sum of K values of the individual job's utility factor (UFK). The UFK is the corresponding job's priority divided by N and multiplied by the number of days before expiration of the N-day period from the current day (i.e., today). In this example, it is assumed that the period of interest is days.

Continuing with the above-noted example, the intent may be to increase a contribution level of the most recent jobs to the CUF. For example jobs processed the day that they are submitted (i.e., today) will contribute their full priority value, while the jobs submitted N/2 days ago, will only be considered with half of their respective priorities. The jobs submitted more than N days ago, would not be considered at all.

Figure 5:
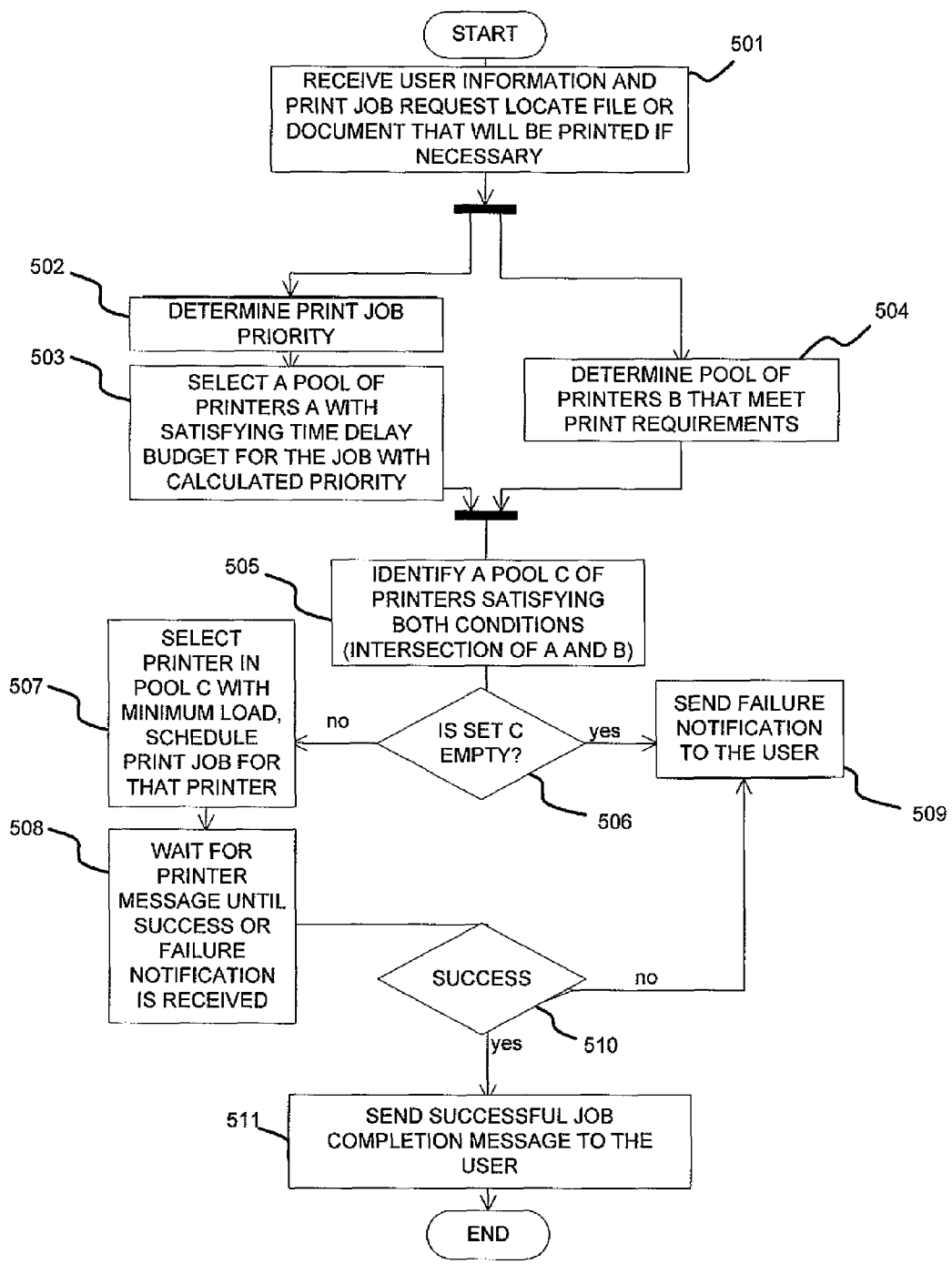
FIG. 5 illustrates an example flow chart according to an example embodiment of the present invention.

FIG. 5 illustrates an example flowchart of the operations performed by the printer server, according to an example embodiment of the present invention. Referring to FIG. 5, a first operation begins by receiving user information and a print job request, and a corresponding file and/or document will be located and printed if necessary at operation 501. Next, a print job priority will be determined at operation 502 and a pool of printers "A" will be selected that are capable of satisfying the time delay budget to process the job based on the priority at operation 503. Concurrently, another operation may be performed to determine another pool of printers "B" without performing any priority calculation at operation 504.

Another pool of printers "C" may also be determined that satisfy the both the conditions of the first set of pools "A" and "B" at operation 505. A decision is then made as to whether the pool of printers "C" is an empty set (i.e., no printers available in pool "C") at operation 506. If there is at least one printer in pool "C", then the printer with the minimum load will be selected in pool "C" and the print job will be scheduled for that printer in operation 507. The printer will then send a notification of success or failure at operation 508. Alternatively, if there are no printers in pool "C", the user will receive a failure notification at operation 509. Operation 510 confirms success of the print job being executed. If there was a failure then the user is notified of an error, and if the print job was successful the user is notified of the successful job completion at operation 511.

As noted above, the RPS 220 may perform a first task of calculating the priority of the print job submitted. A second task may also be performed to include the identification of printers that are capable of performing the desired print job. There may be a plurality of printers satisfying such a selection criteria. The RPS 220 may evaluate a current load on each of the pre-selected printers. Load may not be defined based only on a number of print jobs currently scheduled or being executed. Instead, load may also include a total real-time estimate that it would take for all the currently scheduled jobs to be completed by a particular printer. The RPS 220 may assign a new print job to a printer with the lowest load, so that an overall load of the entire processing networking system is kept to a minimum.

The RPS 220 may schedule print jobs in such a manner that an expected completion time of a submitted print job does not exceed the desired pick-up time specified by the user. If such scheduling is not possible, the user may be informed of the expected delay and will be given an option to cancel his print job. Upon completion of the print job, the user will receive a notification. These messages are exchanged between the printer and the RPS 220, and, between the RPS 220 and the PCS application 120 at the user computer 110.

In one example, the PCS application 120 of the user computer 110 may receive a failure notification from the RPS 220. In such a case, the PCS application 120 may analyze the failure reason specified by the RPS 220 and try to make an adjustment to the original request, re-send the request, and/or select another RPS server that may be available.

One example failure reason may include, for example, incompatible requirements, such as, requirement "A" is incompatible with requirement "B." For instance, a user request for a two-sided print job on a dot-matrix printer, which is incapable of two-sided printing. Incompatibility issues may also be due to limited resources available to the RPS 220. For example, a user may request a full color plotter printout. However, only a black and white plotter may be available to the RPS 220 in order to complete the job in time. In such a case, the user may be asked to adjust her requirements, and the PCS 120 may make these suggestions to the user for troubleshooting assistance.

Another example failure reason may include the RPS 220 resources being unavailable before a print job was completed and/or a loss of connection with the RPS 220. In this case, the PCS application 120 may inform the user and suggest re-submitting the job to another RPS. In any case, some time will have passed since the last request, and, thus, the user may decide to change the requirements or even cancel the request altogether. If the user does not respond immediately, RPS 120 will wait for a response for a predetermined amount of time, and then may re-submit the job to the next best RPS 220 itself without any user input.

Yet another example failure reason may provide only part of the job being completed and the rest of the job cannot be completed for any of the reasons specified above and/or some other reason. In that case PCS 120 would inform the user and suggest to complete the job without re-doing what was already printed. If the user does not respond immediately, RPS 120 will wait for response for pre-determined time, and then re-submit the remaining job to the next best RPS 220 it can locate.

The PCS application 120 will maintain in a memory storage of the user computer 110 all the necessary information and corresponding data files that were sent to the RPS 220. This provides an optimized data retrieval mechanism in case of a needed re-submission needed. For instance, if an error is received from the printer and forwarded from the RPS 220 to the user computer 110. Also, assuming a delay notification message is received, the PCS application 120 will have the option of canceling the print job and re-submitting the job at a later time. Alternatively, the job may be sent to a different print server, in case there is a different pool of printer resources available.

The PCS application 120 will discard the stored print job information upon receiving a successful job completion notification and/or decision to cancel the print job.

One example of a priority measurement is illustrated in Table 1, according to an example embodiment of the present invention. Referring to Table 1, a list of recent jobs submitted by the user with a user index (UI)=X in the last N (N=5) days is illustrated.

TABLE 1

| Job Number | Job Priority | Days Left Until Expiration of Five-Day Period |
|---|---|---|
| 376 | 12 | 1 |
| 427 | 10 | 3 |
| 501 | 5 | 5 |

Given the above-noted values of Table 1, the cumulative utility factor (CUF) would be =1+12*(1/5)+10*(3/5)+5*(5/5)=14.4.

In another example, Table 2 provides information on a current job submitted by the user with ID=X.

TABLE 2

| Category | Information Item | Numeric Value | Weight | Value * Weight |
|---|---|---|---|---|
| Category One | User Department | 1 | 2 | 2 |
|  | Project Number | 1 | 5 | 5 |
|  | User Job Complexity | 1 | 1 | 1 |
|  | ... | ... | ... | ... |
| Category Two | Color Option = Full Color | 2 | 3 | 6 |
|  | Page Layout = Landscape | 1 | 1 | 1 |
|  | ... | ... | ... | ... |
| Category Three | Urgency Level = Low | 0 | 1 | 0 |
|  | Wait Time = 24 Hours | 0 | 1 | 0 |
|  | ... | ... | ... | ... |

TABLE 2-continued

| Category | Information Item | Numeric Value | Weight | Value * Weight |
|---|---|---|---|---|
| Category Four | User Input Device = Laptop | 1 | 0.1 | 0.1 |
| | Proximity to RPS 220 = Zone 3 | 3 | 0.3 | 0.9 |
| | ... | ... | ... | ... |
| Category Five | Desired Printing Device = LP | 0 | 1 | 0 |
| | ... | ... | ... | ... |

Given the above-noted values in Table 2, the job priority may be calculated to be =[(2+5+1)+(6+1)+(0+1)+(0.1+0.9)+(0)]/CUF=17/14.4=1.18.

Figure 6:
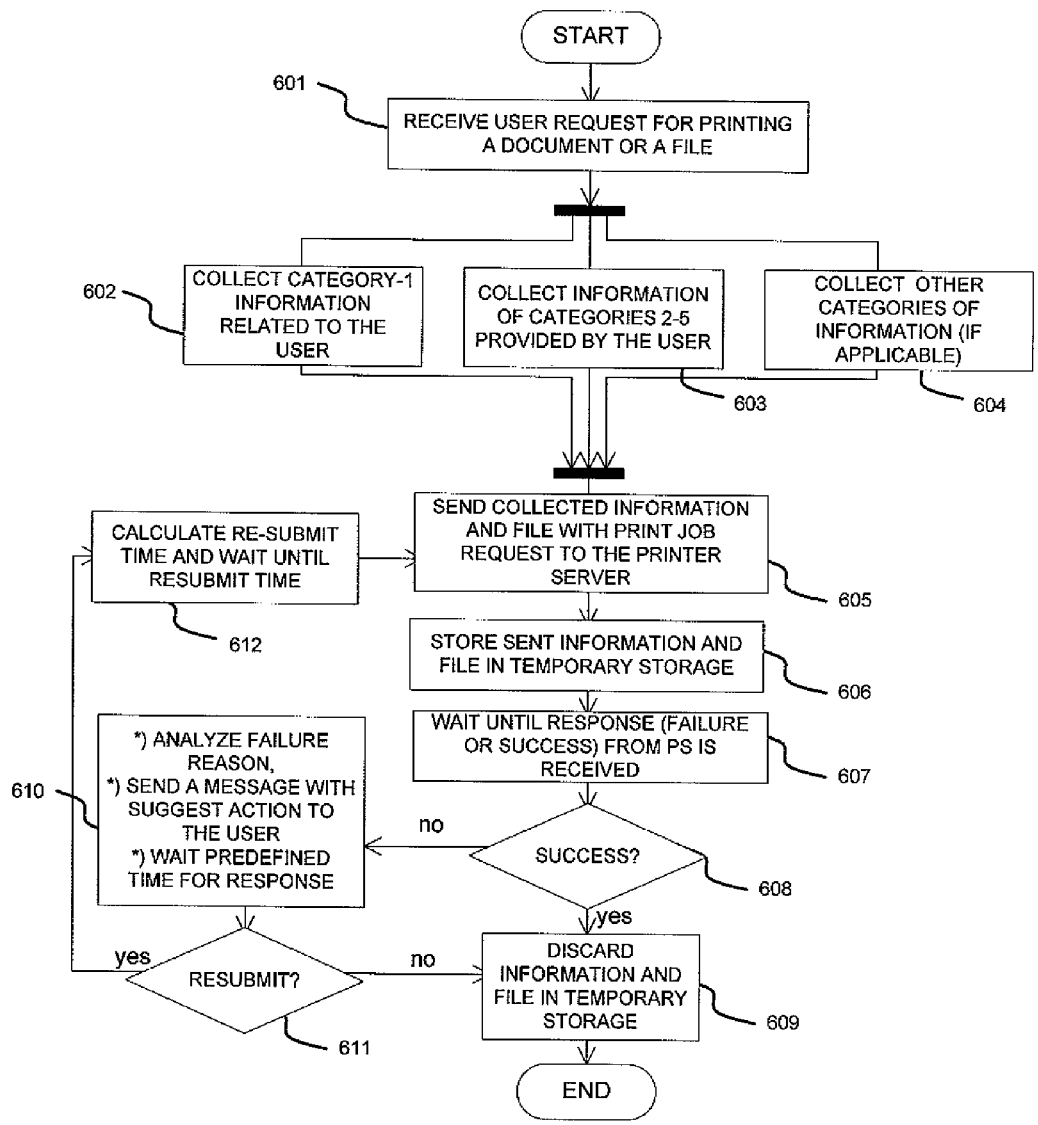
FIG. 6 illustrates another example flow chart according to an example embodiment of the present invention.

FIG. 6 illustrates an example flow diagram of a client software method that may be performed on the user's computer, according to an example embodiment of the present invention. Initially, a request is received to print a document or a file at operation 601. The request may be received internally via the user computer. The information types are then collected based on the user and the job. For example, category-1 information related to the user is collected at operation 602. Additional information types (i.e., 2, 3, 4 and 5) are also collected from the user based on questions posed in windows and/or GUIs at operation 603. Any additional information is then collected, if needed, at operation 604.

The collected information may then be sent along with the print job file and request to the printer server at operation 605. The information that is sent may also be stored locally at the user computer in a temporary file storage memory at operation 606. The print server (PS) may then respond with a success or failure message regarding the print job request at operation 607. If it is determined to be successful at decision operation 608 then the locally stored information may be discarded at operation 609. If the job has failed then the failure reason is analyzed and a message is sent to the user and a predefined time is waited at operation 610. The job may then be re-submitted at operation 611 and a re-submit time and wait time are calculated at operation 612 prior to resending the print job at operation 605.

Figure 7:
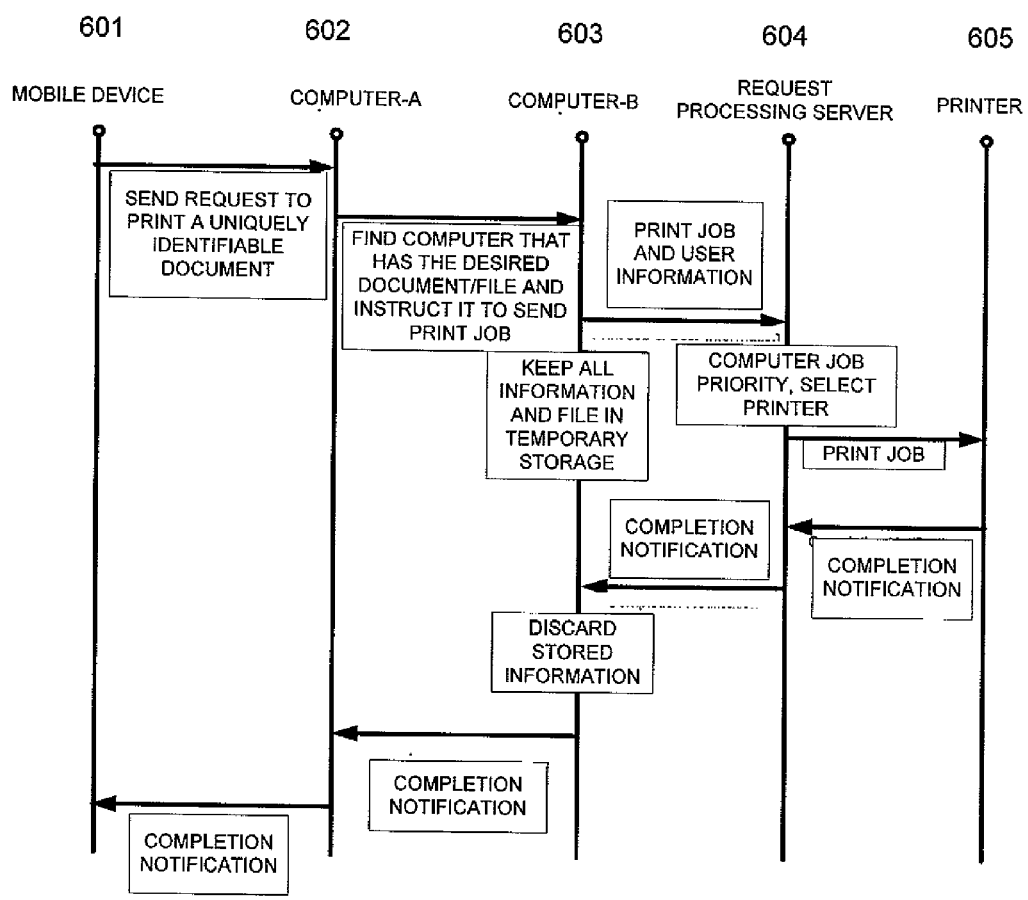
FIG. 7 illustrates another example flow diagram according to an example embodiment of the present invention.

FIG. 7 illustrates a flowchart of an extended call flow diagram between the mobile device, computers, printer server and printer, according to an example embodiment of the present invention. Referring to FIG. 7, communication signaling is illustrated between a mobile device 601, a computer-A 602, a computer-B 603, a request processing server 604 and a printer 605.

Initially, the mobile device 601 sends a request to print a uniquely identifiable document to computer-A 602, which then finds a computer-B 603 that has the desired document/file and instructs it to send a print job. The computer-B 603 then sends a print job and user information to a request processing server 604. The computer-B 603 also keeps all information and corresponding data file information in a temporary storage memory. The print job and user information are received at the request processing server 604, which computes the job priority and selects a printer based on the information received.

The print job may then be sent to a suitable printer 605. Upon successfully completing the print job, the printer may initiate a job complete notification and send the notification back to the request processing server 604. The request processing server 604 may then relay the notification to the computer-B 603, which may then discard the stored information now that the print job has been successful. The computer-B 603 may then send the notification to computer-A 602, which then sends the notification to the mobile device 601.

According to an example embodiment of the present invention, the print services and job processing procedures described above may be applied to user's who are traveling to multiple geographical destinations. For example, user's who are traveling for business development, academic and industrial researchers, etc, may all need remote access to printing services. For example, business users often need the latest documents related to presentations, proposals, etc., and while they are traveling.

In one example, a leader of a research group may be traveling overseas to a conference to present his research team's latest results. In this instance, the presentation must be in a large poster format specified by conference organizers. Due to some recently discovered phenomena or other researchers' recently published research results, the presenter may realize that he does not have time to complete the preparation of the poster before he is scheduled to conduct the presentation. The presenter could use a more flexible printing and updating procedure to accommodate his busy career.

According to another example embodiments of the present invention, standards documents may be reviewed and discussed on a regular basis (e.g. once a month) at different locations worldwide. Often it is known that at any particular meeting a certain version of the document will be discussed, and the document becomes available shortly before the meeting at certain locations, such as, known websites, participant's company intranet or Internet, or, may be easily located through an Internet search process.

The user who needs to have a printed copy of the latest version of the document may not have an actual copy of that version in her computer. The user may not want to use time downloading and printing the file because she may be busy doing other work, or, the user may simply find the cost of printing the document at her current location unjustified. Instead, the user may choose to specify the title, version, section and/or pages of the document she needs to be printed, and the location where she desires the printed copy to become available. Other features include the time when the user will pick up the document along with other possible options, as described in detail above.

Referring to FIG. 1, the computer 150 will communicate with the RPS 220 by sending a print request when attempting to print a document. After analysis and initial processing of the print request, the RPS 220 will present the user with printing options and the associated cost of providing the print service. For example, a printed copy of the document may be able to be printed right at the hotel where the user will be staying, or at half the cost at a location five miles away from his hotel. The user may select the option that she prefers and then the RPS 220 will send the print job to a printer at the selected location.

In another example according to example embodiments of the present invention, a user of a mobile device 130 may invoke a software application to specify one or more documents she wants to be printed. Documents may be specified by their origination and/or destination locations. For example, the location of the mobile device 130 indicated by an attachment received via email on the mobile device 130. Other location information may be specified by an Internet directory or local directory of the print server that will be receiving the request. Another document identifier may include some unique identification number such as an IP address or other type of identification.

The mobile device 130 sends a request message to the computer 150 (or RPS 220) via a radio interface base station 140. The mobile device 130 also sends the document to print if accessible via email and/or already stored on the mobile device 130. If the document is not currently accessible via email or already stored on the mobile device, the computer 150 (or RPS 220) may retrieve the document to be printed by receiving a specified location along with the request. Alternatively, the document may be searched for until an exact location of the desired document is found (i.e., by initiating a search on the web 160, or, by using one of the identification methods described above). The document may be located on a computer 150 (or RPS 220), or, any of the computers or storage devices communicatively coupled with the computer 150 (or RPS 220).

Once the document is located, printing may be executed. The printer selection will be determined by numerous input parameters described previously, assuming that the mobile device 130 is near the printer server RPS 220 and/or the corresponding printer(s). If, however, the mobile device is not within a geographic proximity of a printer (i.e., a printer located within a building where the user is present or within walking distance of the user), then the server will perform a search to determine known printers and related locations. Such printer and location information may be located within any of the networks 100, 200 or 300, or, may be ascertained via a web search in order to ensure capabilities that satisfy the user requirements. Such a printer (i.e., printer 320) may be connected to the RPS 220 via the Internet 330, and once printing is completed, the user of the mobile device 130 may be informed.

The RPS 220 may be capable of automatically determining where the print job output will be available to the user. Once the RPS 220 knows the location of the user, at or around the time when the print job request is scheduled to be completed, it will automatically select a printer near that location. The RPS 220 may inform the user of the location(s) in order to receive authorization to print at that location. The RPS 220 may instead automatically print at the location closest to the user, in a more secure location and/or the printing may also be based on any number of other parameters, such as, a type of printer, a type of document, etc.

Obtaining the user location may be derived in many different ways. For example, the user may specify his/her location explicitly. The location may determined by a location detection operation. For example, if a user submits his/her request from a mobile device 130 (see FIG. 1), and if the RPS 220 is known to the base station 140, the radio network will detect the location of the mobile device 130 and provide it to the RPS 220.

In another example, if a user submits his/her request from a mobile device 130 with a built in global positioning system (GPS) functionality, then the client software PCS application 120 may acquire location information from a built in GPS functionality. The location information may then be submitted along with the job request to the RPS 220. Upon completion of the job, the user is informed via the RPS 220 that the print job is complete and is also provided with the location that the user may pick up his/her printed material.

According to example embodiments of the present invention, the pickup locations may be determined by automatically determining a user's identity and matching that identity to the corresponding printed material. At the time of the job request submission, the PCS application 120 may send the user identification information to the RPS 220. The user identification information may be sent to a selected printer or computer and/or at the pickup location by the RPS 220 at the time of job submission. In such a case, the printing of the document will begin when the user is within a particular distance of the printer(s).

Automatic detection of the user identity at the pick up location may be implemented in many different ways. For example, the pickup may be performed by using a Bluetooth protocol and interface via the user mobile device 130 that authenticates the user when attempting to obtain the document at the pick up location. Another example may include the user of the mobile device 130 making a phone call to an interactive voice response (IVR) system of an office where the printed material may be available. In this example, upon connecting to the office, the IVR system may authenticates the user, and allow the release of the corresponding printed material. These examples and previous examples may be extended to other numerous cases that may correspond with the features of the invention without deviating from the scope of the invention.

In another example embodiment of present invention, an information processing request (e.g., document print request) may be performed as described in any of the previous embodiments. However, the delivery may be based on the automatically determined user's location prior to sending the print job to the printer. In this example, the user's location may be identified through the signal received from his mobile device 130. The RPS 220 (or another device) will then send the processed information (e.g., print job) to a processor (e.g., printer) near the current user's location.

Figure 8:
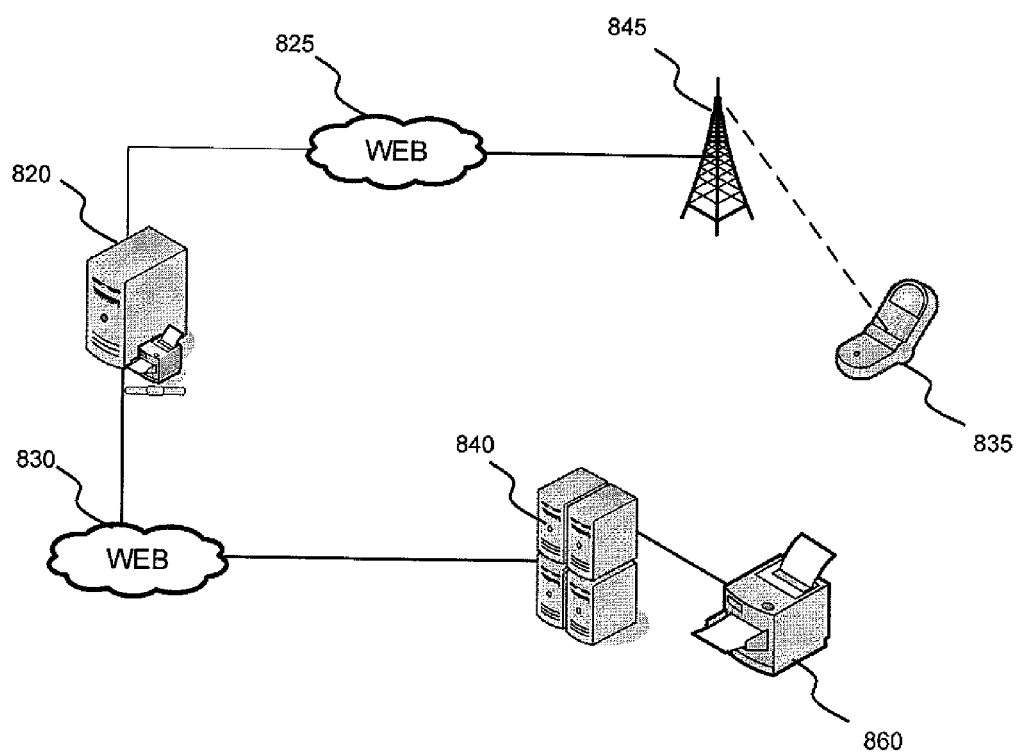
FIG. 8 illustrates another example network configuration according to an example embodiment of the present invention.
Figure 9:
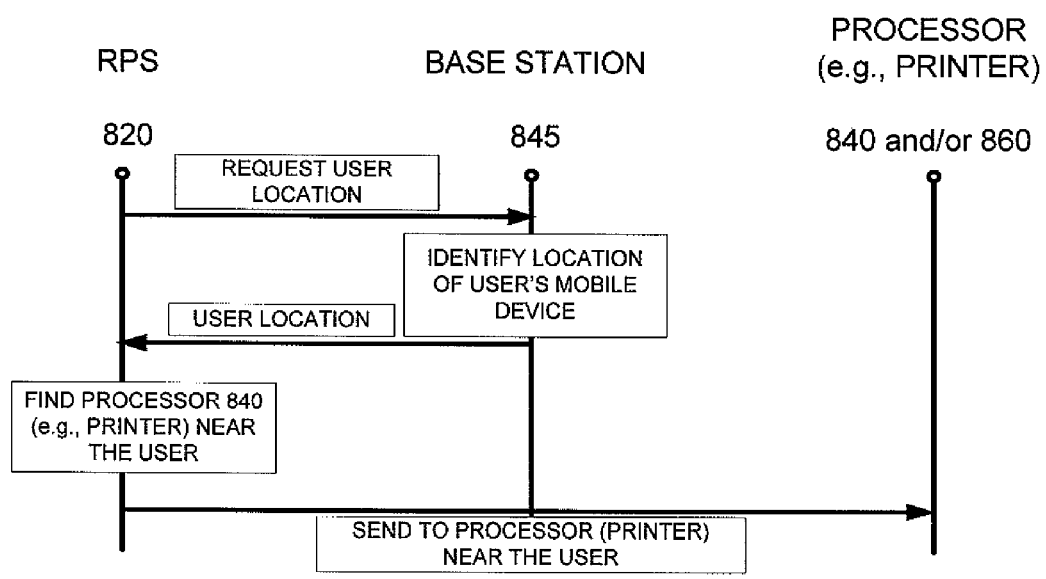
FIG. 9 illustrates yet another example flow diagram according to an example embodiment of the present invention.

FIGS. 8 and 9 illustrate examples of a location determination operation in accordance with an example embodiment of the present invention. Referring to FIG. 8, a mobile user 835 transmits a request for a print job to a communication entity, such as, a base station 845. The request is then transferred over the web 825 and to the RPS 820. The RPS 820 will then request the location of the mobile user 835 from the mobile network 845. Once the base station 845 serving the mobile device 835 identifies the location of the mobile device 835, a response with the location information is sent back to the RPS 820. The RPS 820 will then identify the processor device 840 associated with the needed printer 860 near the mobile device 835, and send the processing job (e.g., print job) to the printer 860 at the appropriate location.

FIG. 9 illustrates an example flow diagram of transmissions conducted between the RPS 820, the base station 845 and the printer 860, according to an example embodiment of the present invention. Referring to FIG. 9, the RPS 820 will send a request to obtain the user's current location information to the base station 845. The base station 845 may identify the location of the mobile user by using any of a variety of algorithms, such as, GPS, triangulation, power estimation, Cell ID notification, etc. The location will then be sent back to the RPS 820 in response to the request. The RPS 820 may then send the print job to the processor device 840 and/or the printer 860 nearest or near the user.

Figure 11:
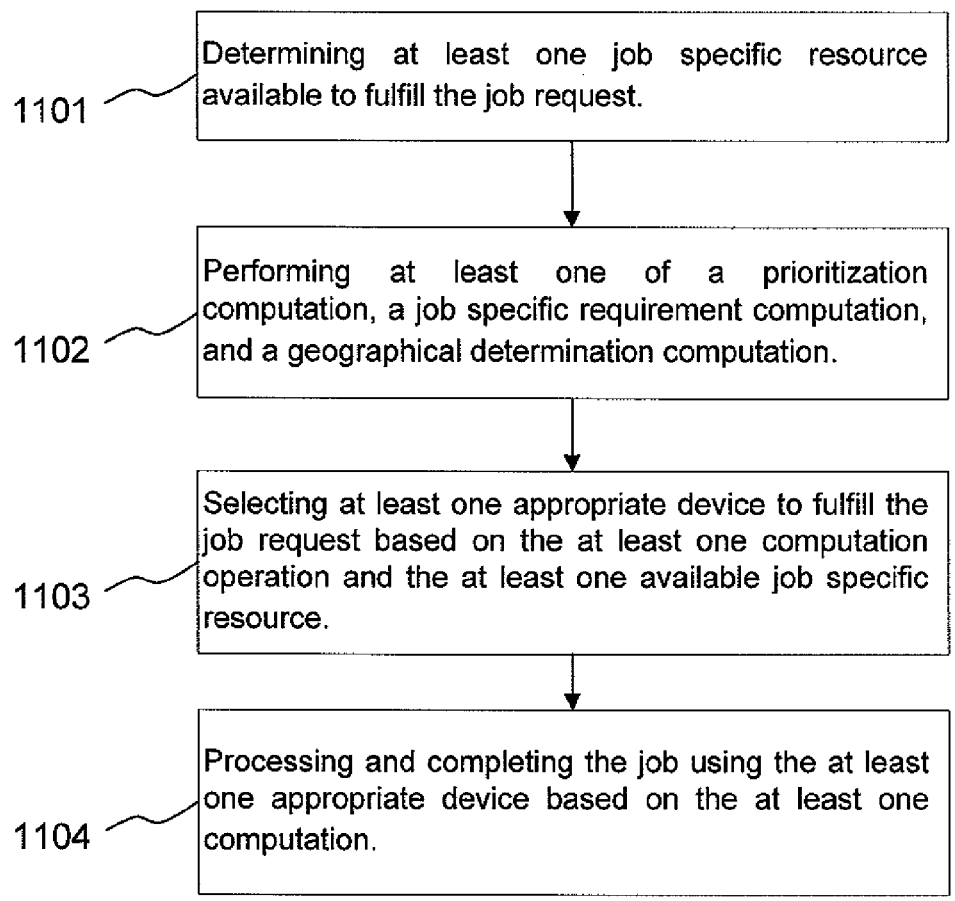
FIG. 11 illustrates an example method according to an example embodiment of the present invention.

FIG. 11 illustrates one example embodiment of the present invention may include a method of processing data associated with a job request. The method may include determining at least one job specific resource available to fulfill the job request at operation 1101. The method may also include performing at least one of a prioritization computation, a job specific requirement computation, and a geographical determination computation at operation 1102. The method may further include selecting at least one appropriate device to fulfill the job request based on the at least one computation operation and the at least one available job specific resource at operation 1103. The method may also include processing and completing the job using the at least one appropriate device based on the at least one computation at operation 1104.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 10 illustrates an example network element 1000, which may represent any of the above-described network components 110, 130, 140, 150, 220, 310, 320, 340, 350, 360, 1210, 1240 and 1250 and other like components in similar drawings.

Figure 10:
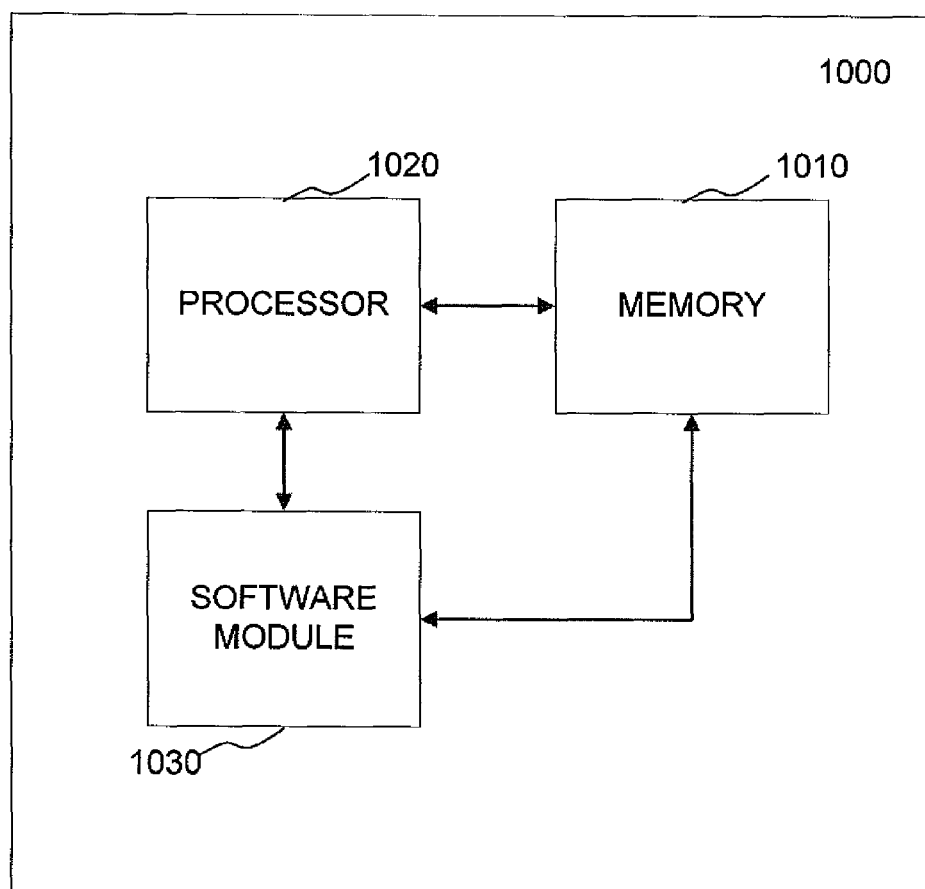
FIG. 10 illustrates an example networking device according to an example embodiment of the present invention.

As illustrated in FIG. 10, a memory 1010 and a processor 1020 may be discrete components of the network entity 1000 that are used to execute an application or set of operations. The application may be coded in software in a computer language understood by the processor 1020, and stored in a computer readable medium, such as, the memory 1010. Furthermore, a software module 1030 may be another discrete entity that is part of the network entity 1000, and which contains software instructions that may be executed by the processor 1020. In addition to the above noted components of the network entity 1000, the network entity 1000 may also have a transmitter and receiver pair configured to receive and transmit communication signals (not shown).

It is important to note that the information processing is not limited to printing documents. For example, information processing could refer to transforming audio, video, or multimedia files or data streams, as will be illustrated in other embodiments that follow. In such cases it is possible for the RPS 220/820 to request processing of information at any geographic location and at the most appropriately suited application processing server. However, the processed data may still be delivered directly to the users device (e.g., mobile device), or, to another device (e.g., laptop) at the same location.

Figure 12:
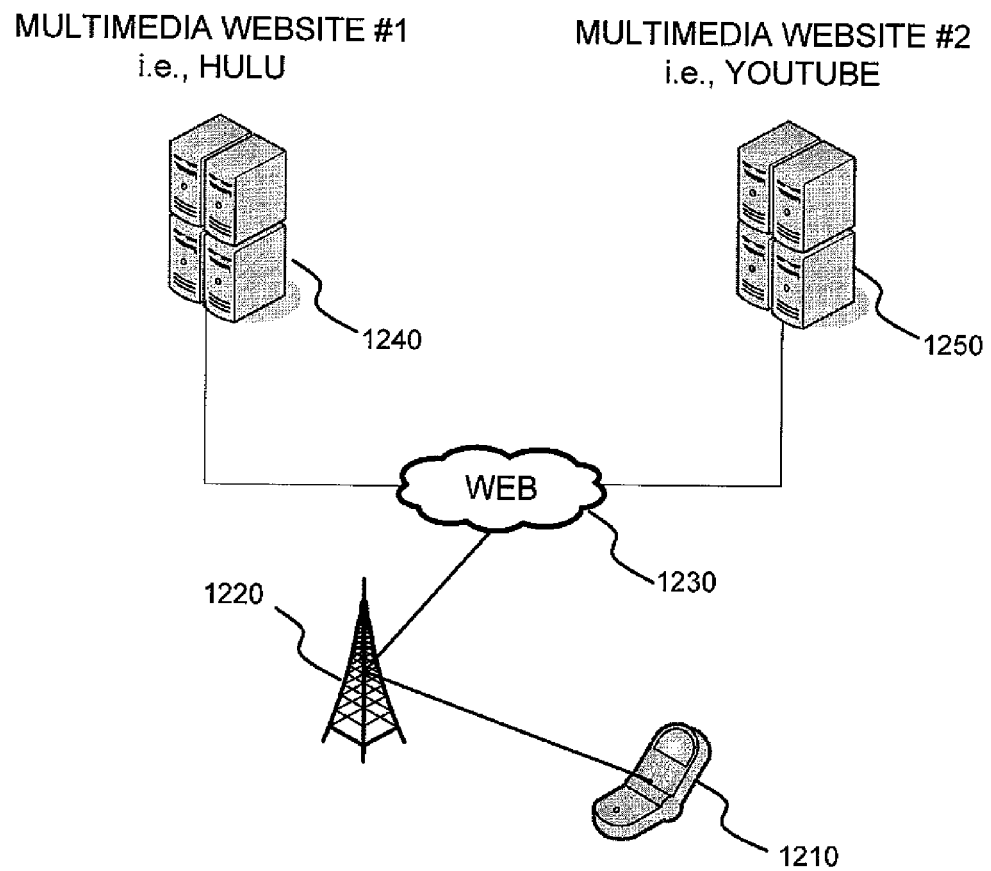
FIG. 12 illustrates an example network diagram according to another example embodiment of the present invention.

FIG. 12 illustrates an example network configuration according to an example embodiment of the present invention. Referring to FIG. 12, a mobile device 1210 permits a user to select a video, audio, or multimedia file that the user wants to be processed by a particular software application, such as, a data file converter. The file conversion process may convert a file into a specific format, for example, a format suitable to be used by a user's personal player device (i.e., a MP3 player and/or personal video player, such as, an Ipod®).

Assuming that the user has located a particular content file and content location (i.e., a video format file and video content location), the user may desire to have that information downloaded and saved to the user's personal device. The content may be a television show that is stored on a website, such as, Youtube® or Hulu®. The user may desire for the data to be transferred to her personal device.

The data content desired by the user may be located on a particular multimedia website server (e.g., Hulu's® content server 1240 and/or Youtube's® content server 1250). The content may be downloaded over the Internet 1230, which is transferred to a base station 1220 and delivered to the user mobile device 1210. The user's mobile device may be a mobile station that is capable of storing, playing and reformatting the downloaded data. Alternatively, the user's mobile device 1210 may be used as a computer readable storage medium to store the downloaded data until the data may be transferred to the user's personal device.

However, the data that is discovered on these remote website servers may not be in the proper format desired by the user. In other words, additional processing and location transfers may be required before the content is properly accessible to the user. The need for such processing arises in different situations. For example, when the user plans a relatively long trip by car, bus, train, and/or by air, the user may desire to create his/her own entertainment program(s). Another example is of a user who wants to listen to selected audio files or music while exercising. Of course, there are many other examples where such multimedia files or data stream processing will be implemented.

Certain applications that permit conversion of some individual multimedia files and/or data streams are commonplace. However, end-to-end/turnkey data processing applications require more information that simply a desired file format. For instance, creating an "entertainment program" that includes multiple processed files and/or data streams satisfying each individual user's requirements may be time consuming, tedious and require multiple user input operations.

In one example, an MP3 player may play files in any of a .MP3, .FLV, .AVI, or, other data file formats. Depending on the desired quality of the multimedia stream and the amount of available storage, (i.e., hard drive space available on user's player device), the software itself, or, the user may perform a selection of a specific data format. The software application may provide options for the user to compile an "entertainment program" out of audio, video, multimedia clips and/or files that may be found on the Internet by doing a web search (e.g., via a Google search), or, at a specific web site. In addition, the data files may be located on the user's LAN or her application device, mobile device, computer, etc.

As noted above, FIG. 12 is a network diagram of a mobile phone 1210 connecting to media servers 1240 and 1250 via the Internet 1230. For each selection made by a user, the search may be performed on websites which offer free access to the desired media content (i.e., television shows). In the case where no such sites are located, the user may be prompted with the option of downloading files, clips, and/or data streams for a fee at a different website or server location.

Figure 13A:
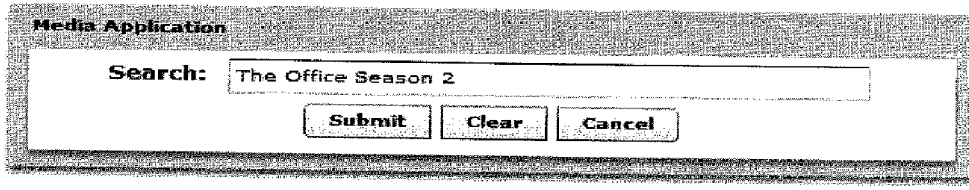
FIGS. 13A-13C illustrate example screenshot windows of the GUI used to perform a search according to another example embodiment of the present invention.

FIG. 13A illustrates an example of a user selecting a search option, according to an example embodiment of the present invention. Referring to FIG. 13A, a graphical user interface (GUI) window is illustrated that permits the user to enter a search query. In this example, the search is "The Office Season 2", which is an example television show that the user may be seeking to obtain a copy of for her mobile device. The software application will prompt her to select one or more of all the available episodes, and to specify the order in which she desires to compile the entertainment program. If a prior history of video program creation exists, the software application may prompt the user to add more episodes, which have not yet been compiled or placed in the current entertainment program. For instance, if the user has selected episodes 1, 2, and 3 at a previous time, then the software may suggest episodes 4, 5 and 6 also be added to the current entertainment program. The user may also alter the selection as desired.

Referring to FIG. 13A, the window includes a text area where the user may enter a search string of content that is desired to be searched. The user has the option to select the "Submit" button to send the query to the server for processing. The user may also press the "Clear" button to clear the search field, or, the user may press the "Cancel" button to remove the window from the display. FIG. 13A represents one example search option. One skilled in the art will recognize that there are many different indications that may be added to a media search window without deviating from the scope of the current invention.

Figure 13B:
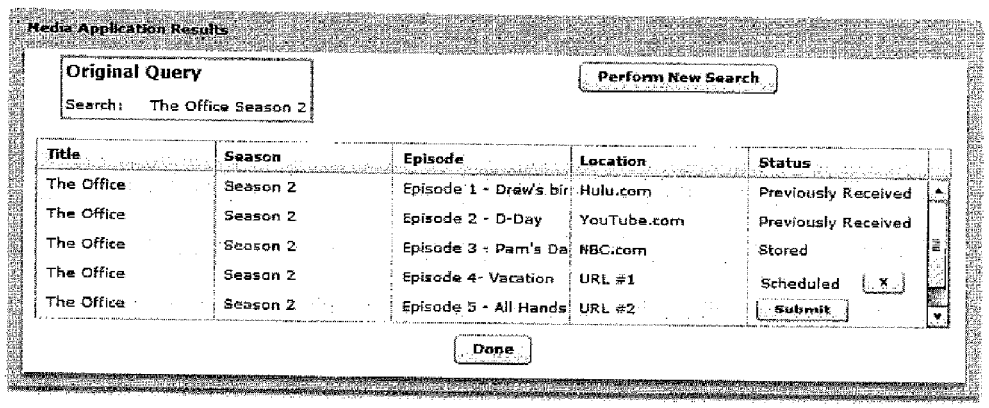

FIG. 13B illustrates an example GUI representation of a media application result window, according to an example embodiment of the present invention. This window may be displayed to the user once the query has been submitted and the system returns a response. In the top left box of the window, the original query is displayed "The Office Season 2." There is a button on the right, "Perform New Search" that, when selected, will remove the window from the screen, and return the user to the media search window illustrated in FIG. 13A.

The grid in the middle of the media application results window of FIG. 13B depicts the results of the user's search. This grid is scrollable, and may be controlled via the scrollbar seen on the right side of the grid. Inside the grid, there exists five columns, each displaying the respective parts of each of the results of the query (e.g., Title, Season, Episode, Location, Status). The last column "Status" represents the current status of the particular result generated. As may be observed from the grid of FIG. 13B, the first result, "Episode 2", has a present status of "Previously Received", which indicates that "Episode 2" has previously been received by the current user.

The next result, "Episode 3", has a status of "Stored", which indicates that the user's device may not have enough memory to store the content. The content will automatically be downloaded in order (based on episode number or the last viewed episode) when enough memory is available. The user may be alerted to the download when the memory becomes available.

The final three results of FIG. 13B each have a "Submit" button in the status column. When this option is selected, the particular result will be queued until the content is ready to be received by the user. There is also a "Done" button on the bottom of the media application results window that, when selected, will remove the window from the display. If necessary a message will be sent to the server to search for any additionally needed content. The GUI representation of FIG. 13B illustrates an example only. One skilled in the art will recognize that there are many different indications that may be added to the proposed GUI media application results window without deviating from the scope of the current invention.

Figure 13C:
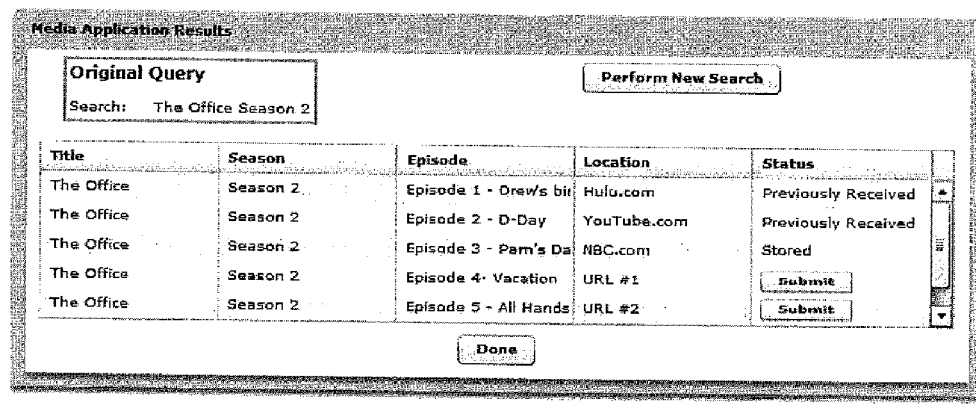

FIG. 13C illustrates another view of the media application results window, according to an example embodiment of the present invention. In this example, the first "Submit" button has been selected by the user for the result of "Episode 4." In this GUI, the "Submit" button has been removed, and the text "Scheduled" has been added indicating to the user that the current result are scheduled to be received by the server for processing. There also exists an "X" button that, when selected, will cancel the scheduled request.

The selection of the number of episodes and their respective format may be determined automatically based on the available storage space and desired quality of the entertainment program. For example, the user may be offered a choice of having their content encoded at any of a variety of different bit rates, such as, very good quality, good quality, low quality, etc. Additional options may include changing the amount of the user's storage space, which may also be determined automatically by the software application. For example, a determination may be made based on 50% of the total available hard drive space on the user's device.

Once these selections are made, the software application will suggest formats that will fit the user's requirements. If none of the formats match the user's device capabilities, such as, a format that is not currently installed on the user's machine or requires a higher processor speed, then the user may be prompted to change her initial format selection and/or reduce the number of episodes selected and/or lower the desired quality of video, etc.

All the input information items may be divided into groups called information categories. Each category may carry a certain weight that may be used when prioritization of a job request is implemented. The division into different categories will be performed at the application processing server and can be preconfigured. Once the requirements are made consistent and finalized, the software application may form a request and sends it via radio link from the mobile device to the base station, which will forward the request to the request processing server (RPS) 220 communicatively coupled with the base station 140 via LAN 100 (see FIG. 1).

Before sending the request the mobile device may find a specific location for each file/clip on the Internet. For example, episodes 1 and 2 may be downloaded from the website Hulu®. The next episode may be downloaded from Youtube®, etc. The mobile device could also select to delegate this search to the RPS 220, in an effort to save time. In that case, the RPS 220 may do the search itself or send the request to certain other specialized devices that are capable of recognizing and finding the exact location of the desired multimedia files.

Once the request for creation of the entertainment program is received by the RPS 220, and the location of each part of the entertainment program is determined, the RPS 220 either does the file/stream conversion locally (if it is configured to provide such a capability), or, alternatively, the processing task is sent to a different application server, such as, 340 over the LAN, or, 350 over the Internet 330 (see FIG. 1).

When the RPS 220 receives a high volume of requests of users competing for limited specialized application server resources, the RPS 220 will prioritize requests based on information received from each user. The prioritization may based on a utility function which evaluates whether the user is using free file conversion services or is paying a fee for the services. Naturally, the users who pay for the service will be given a higher priority (utility) value.

To calculate the priority, the RPS 220 first maps each of the inputs provided in each of the information categories to their corresponding numerical value. Next, the inputs are multiplied by a weight. The weights can be either preconfigured and remain the same between the application server maintenance windows, or, they can be dynamically adjusted depending, for example, on the availability of application servers with certain capabilities, the importance of the job requests from certain users, etc. Then all the multiplied pairs of numbers are added (and normalized, if necessary) and adjusted (divided) by the cumulative utility factor (CUF). These calculations provide a single numerical value that is available to the RPS 220 to make a decision on the priority of the present job compared to other jobs that are in the queue for access to the application processor. The CUF is a fairness enforcement mechanism and is described in further detail below.

In order to prevent a single user from continually receiving the highest priority on his/her service processing requests, the fairness mechanism may be implemented. The RPS 220, receives orders from various sources and creates a unique identifier (UI) for each user submitting a job request. Each user's UI is a combination of items which may include, for example, the user's department, their location, etc. For each user that has submitted at least one job in the time period N (where N is a configurable parameter for each RPS and can include one or more of minutes, hours, days, weeks, months, years, etc.), the RPS 220 will maintain a record of the number (K) of jobs submitted by the user and their respective priorities.

These priority values may be combined into the CUF computed as 1 plus the sum of K values of the individual job's utility factors UFK (where UFK is the corresponding job's priority divided by N and multiplied by the number of days before expiration of the N-day period from the present day, assuming the period being used is days). The priority mechanism may increase a contribution level of the most recent jobs to the CUF. For example, jobs processed the same day they are submitted will contribute their full priority value, while the jobs submitted N/2 days ago, will contribute only half of their priorities, and jobs submitted more than N days ago, would not be considered at all.

Among the users of equal status (i.e., two users from the same company department), the application program will evaluate the required time needed to process files/data streams and schedules jobs so that they may be completed by the desired time specified by the user. If the application program calculates that the desired time is not a possibility, then the job may simply be delayed and the user will be notified. One skilled in the art will recognize that there are many different categories and priority evaluation factors with different weights that may be added to determine a priority level. If the user cannot be served in the time specified by the user, the RPS 220 will notify the user.

The RPS 220 will instruct the application server that has been selected to perform the data processing (i.e., file conversion) to send the file back to the user, or, back to itself, so that it may check the file for data integrity (e.g., right size, right format, etc.) and forward it to the user's device. In such a case where the user requested file is to be transmitted to a specified address on the Internet (i.e., email box), the RPS 220 will send the file to that address.

According to another example embodiment of the present invention, processing may be performed when a recurring story line is occurring at a particular portion of a song or video. For example, the processing may include auditing a particular a "recurring story line" phrase that may be included at one or more times during the video and/or song. When the matching video and/or song encounters the matching phrase that is desired by the user, a message may be sent to the user indicating that a match has occurred, and the portion of the media containing the matching phrase is included in the message.

In one example, a video for the television show "The Office" often has a recurring line in many of its episodes, such as, "That's what she said." Another example, would be a video for the show "Family Guy", which often has recurring instances of the character "Stewie" pronouncing the letter "h" in certain words such as "Wil Wheaton" or "Cool Whip." In other examples, various songs by artists may have a "recurring story line", such as, war, money, God, love, animals, etc.

Figure 14A:
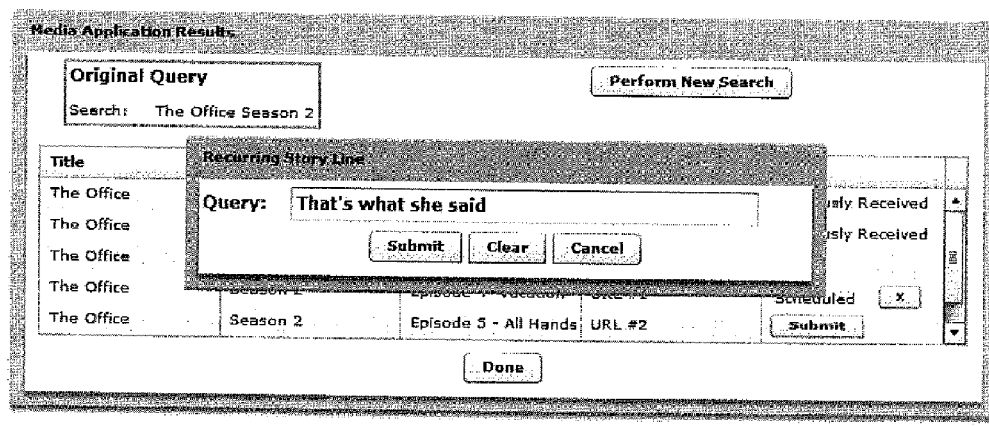
FIGS. 14A and 14B illustrate other example screenshot windows of the GUI used to perform a search for a recurring story line according to another example embodiment of the present invention.
Figure 14B:
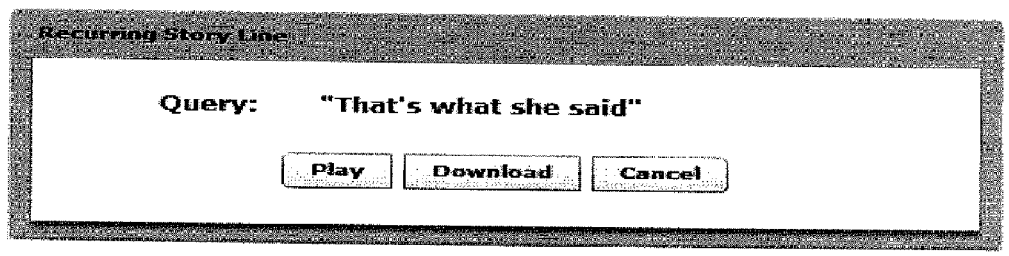

FIG. 14A illustrates an example of the media application results window with a recurring story line query displayed, according to an example embodiment of the present invention. The user may have the option of selecting the "Submit" button to enable the video monitoring feature to review the content of the video and alert the user when the video encounters a matching story line. If the user selects the "Clear" button, the query field will be cleared. If the user selects the "Cancel" button, the recurring story line window is removed.

FIG. 14D illustrates the results of finding a match for the recurring story line. Referring to FIG. 14D, the match is displayed and the user is provided with the option to watch the video. The speech in the video may be converted to text so that the user may read the matching phrase based on the conversion. Speech-to-text functionality is commonplace and may be used to monitor the voice of the video and transcribe words based on the audio track of the video.

Once the words are transcribed from the media in the currently playing song or video, the beginning and ending time points may be logged and stored when the "recurring story line" query is matched. The beginning and ending time points are included in the message sent to the user. The user may play and/or download that portion of the song or video. FIG. 14A illustrates a recurring story line message sent to the user when a match is found in the song or video. The user has three buttons on the bottom of the window. If the user selects the "Play" button, the portion of the video or song will play, then the message will be displayed again. If the user selects the "Download" button, the user will have the option to download that portion of the video or song to her device. If the user selects the "Cancel" window, the recurring story line window is removed.

Once the user initiates the "recurring story line" functionality, the application program will continue to monitor future songs and videos for that particular "recurring story line", and alert the user when a match is made. This cross-platform auditing of "recurring story line" functionality incorporates the linking of seemingly dissimilar information. For instance, the user may be alerted that an artist whose song they downloaded has a song where the words "Cool Whip" are used, based on the original search for such a term in the Family Guy episode.

Figure 15A:
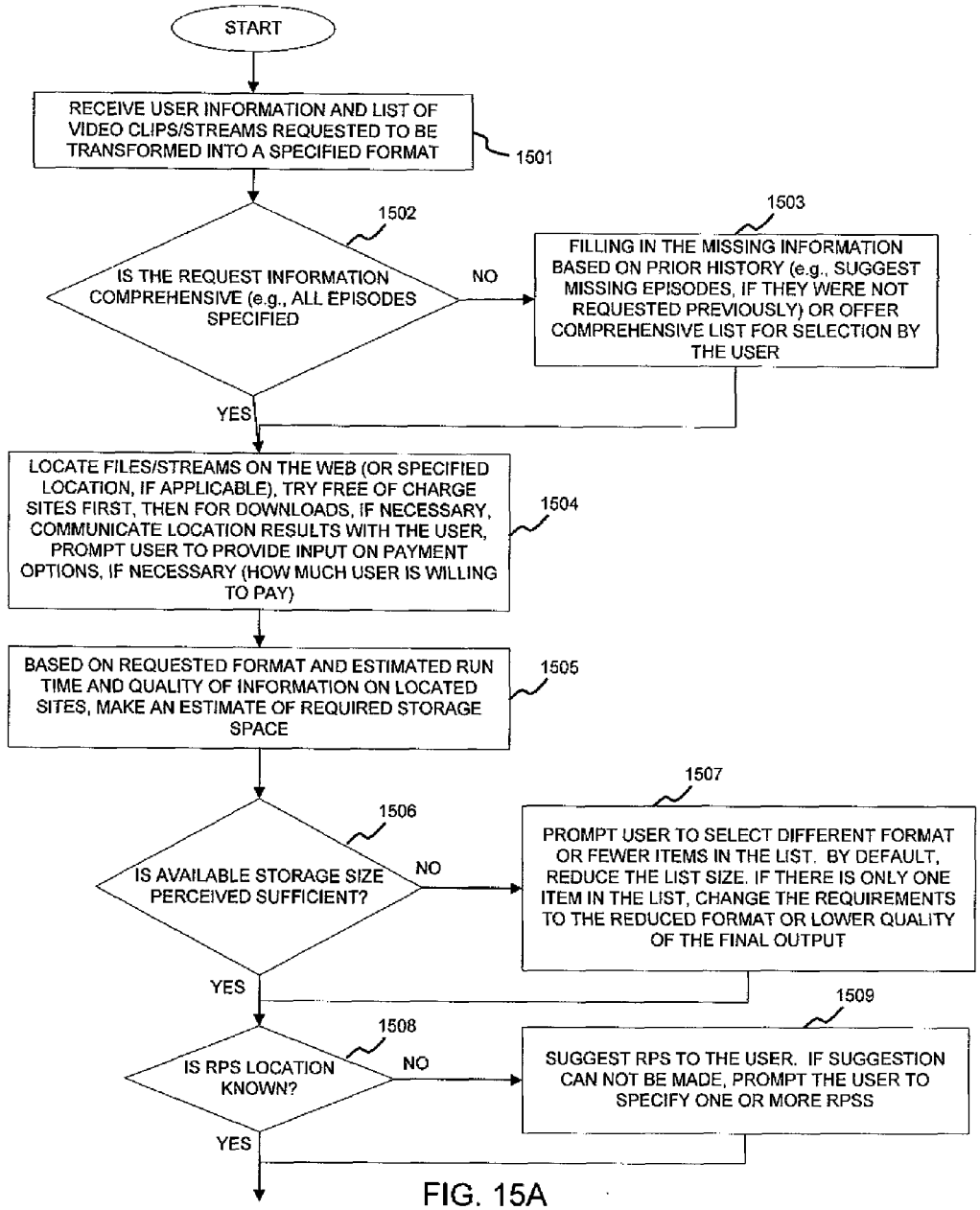
FIGS. 15A and 15B illustrate a single flow diagram of an algorithm application on the user side according to another example embodiment of the present invention.
Figure 15B:
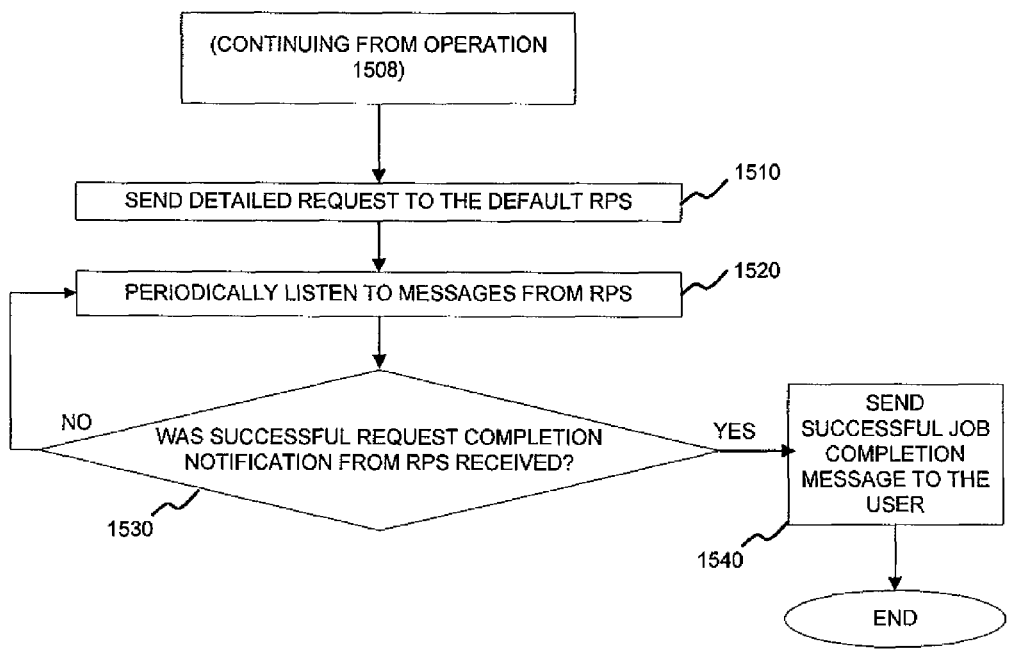

FIGS. 15A and 15B illustrates an example flow diagram of the procedure of the data file processing algorithm, according to an example embodiment of the present invention. The algorithm may be executed on the user's mobile device. In operation, the user may submit a request to transfer multimedia files and clips. The request will be passed along to the RPS 220.

Referring to FIG. 15A, the procedure begins by the user providing her information and a list of video and/or other data requested to be transformed at operation 1501. Next, a decision is made at operation 1502 as to whether the request information is comprehensive (i.e., are all episodes specified?). If the request is not comprehensive, operation 1503 fills in the missing information based on the user's prior history by suggesting certain episodes or other information for the user to select at operation 1503. If the information is comprehensive operation 1504 proceeds accordingly.

Next, at operation 1504, the files and/or data streams are located on the web (i.e., at content websites), free sites may be tried first and then pay sites may be tried second. The user is notified of the results and is given the option to accept the content providing options and/or pay if the third party content provider websites require prior payment. At operation 1505, the amount of storage space required is estimated based on the requested format, run time of the content file and quality requested by the user. A decision is then made as to whether there is enough storage space at the destination location (i.e., the user's device) at operation 1506. If there is not enough storage memory available, the user is prompted to select a different format or fewer items in the list. The list may be shortened by default and if there is only one item in the list, then the format and quality may be reduced to lower the amount of storage space required at operation 1507.

If there is enough storage space then another determination is made as to whether the RPS location is known at operation 1508. If not, the RPS that is available may be suggested to the user or the user may specify an RPS to perform the data processing at operation 1509. If the RPS location is known, then a detailed request is sent to the default RPS so that it may perform the processing based on the information included in the request at operation 1510 in FIG. 15B (a continuation of FIG. 15A). At operation 1511, messages are listened to from the RPS to check the status of the file processing. A decision is then made as to whether a successful request completion notification from the RPS is received at operation 1512. If not, then listening for new messages is repeated until an update is discovered. If the completion notification has been successfully completed then a successful job completion message is sent to the user at operation 1513.

Figure 16:
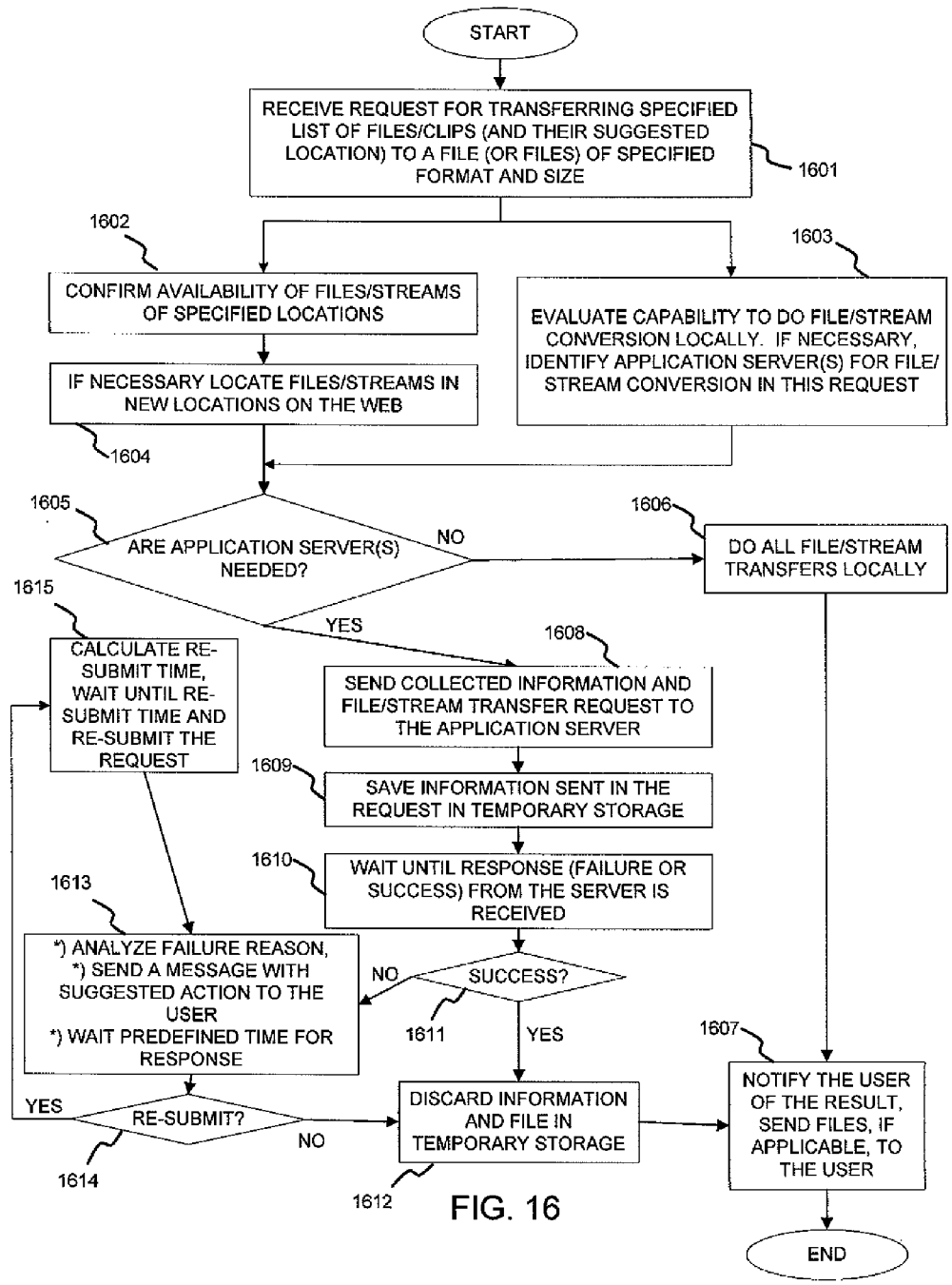
FIG. 16 illustrates another flow diagram of an algorithm application on the server side according to another example embodiment of the present invention.

FIG. 16 illustrates a flowchart of the algorithm running on the RPC when a file transfer and related data processing request is received. Referring to FIG. 16, a request is received for transferring a specified list of files and/or clips and their suggested location, and requested file format and/or size at operation 1601. The availability of files and/or data streams are confirmed at their specified locations at operation 1602 and the ability to do file and/or data stream conversions locally is evaluated at operation 1603. At operation 1604, the files and/or data streams are located on the Internet.

Once these preliminary operations are performed, operation 1605 determines whether there are application server(s) needed. If not, operation 1606 determines all files and/or data streams are transferred locally, and operation 1607 notifies the user of the result and sends the files (if applicable) to the user. Alternatively, if the application servers are needed, operation 1608 sends the collected information and file and/or data stream processing requests to the application server. Operation 1609 then saves the information sent in the request in a temporary storage memory location. Next, the application waits for a response (failure or success) from the server at operation 1610.

A determination is then made at operation 1611 whether the data processing operation was successful. If not, the reason for failure is analyzed, a message is sent to the user suggesting a course of action and a predefined time period is waited for a response from the user at operation 1613. After the time period has expired, a resubmission of the request may be performed at operation 1614. The resubmission time is calculated and waited and then the request may be resubmitted at operation 1615. Alternatively, the information may be discarded from the temporary storage memory location at operation 1612.

Table 3 includes a list of recent jobs submitted by a user with UI=X in the last N (N=5) days.

TABLE 3

| Job # | Job Priority | Days left to expiration of 5-day period |
|---|---|---|
| 376 | 12 | 1 |
| 427 | 10 | 3 |
| 501 | 5 | 5 |

In order to calculate the cumulative utility factor (CUF) to provide a simply numerical value the following computation may be performed: CUF=1+12*(1/5)+10*(3/5)+5*(5/5)=14.4. The CUF is computed as "1" plus the sum of K values of the individual job's utility factor (UFK). The UFK is the corresponding job's priority divided by N and multiplied by the number of days before expiration of the N-day period from the current day (i.e., today). In this example, it is assumed that the period of interest is days.

Table 4 illustrates a list of information of various categories related to a job request from the user with UI=X.

TABLE 4

| Category | Information item | Numeric value | Weight | Value * Weight |
|---|---|---|---|---|
| Category One (only one of these options may be selected for each user) | Paid Service Type | 1000 | 1 | 1000 |
| | Free Service | 1000 | 0 | 0 |
| Category Two | Number of files/clips | 3 | 1 | 3 |
| | Estimated duration of MM play (mins) | 30 | 1 | 30 |
| | Format (select one): | | | |
| | Format = AVI | 2 | 5 | 10 |
| | Format = MP3 | 1 | 2 | 2 |
| | . . . | . . . | . . . | . . . |
| | . . . | | | |
| Category Three | Urgency level = Low | 0 | 0 | 0 |
| | Wait time = 24 hrs | 1 | 0 | 0 |
| | . . . | . . . | . . . | . . . |
| Category Four | User Input Device = Cell Phone | 1 | 0 | 0 |
| | Proximity = Zone 1 | 1 | 0 | 0 |
| | . . . | | . . . | |
| Category Five | NA | 0 | 0 | 0 |
| | . . . | . . . | . . . | . . . |

As illustrated above, Table 4 illustrates an example of a table depicting the calculation of the weights for particular media files, according to an example embodiment of the present invention. A job priority for a paid service will be greater, for example, since the utility assigned to category one information for the user with a paid service should be greater than an option for the user with a free service. Depending on each of the options selected for categories 1 and 2, the unadjusted utility would be different. The calculation and adjustment to the CUF is performed in a manner similar to the previous examples (see calculations for Tables 1 and 2).

Table 4 illustrates how requests for converting specified files and/or data streams are prioritized. For example, if one request is made to convert 3 clips for free with a total estimated duration time of 30 minutes and with a format of .AVI, the unadjusted utility based on this information only would be: 0+30+3+10=42. Another request may come from a user who paid for the service, but wants to convert a short two minute single movie clip file into a .MP3 file. Then the corresponding unadjusted utility would be 1000+1+5+2=1008. The second request will have a higher priority over the first request at least for the reason that the user has a paid service as opposed to a free service.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    applying respective weights for a plurality of information items to determine a job priority;
    concurrently determining a first pool of printers based on the respective weights and a second pool of printers without using the respective weights;
    determining a third pool of printers from the first pool of printers and the second pool of printers;
    selecting at least one appropriate device from the third pool of printers to fulfill a job request based on the respective weights and at least one available job specific resource, the third pool of printers satisfying conditions of the first pool of printers and conditions of the second pool of printers; and
    processing and completing the job using the at least one appropriate device based on the respective weights;
    wherein the applying of the respective weights for the plurality of information items to determine the job priority comprises taking a value of the collective weights of the plurality of information items and dividing the value by a cumulative utility factor.

2. The method of claim 1, wherein the at least one job specific resource comprises at least one of a printer type, an available printer and a printer's output format.

3. The method of claim 2, wherein the printer type comprises a laser printer, a color printer, an ink-jet printer, or a color laser printer.

4. The method of claim 2, wherein the printer's output format comprises a gray scale output, a black and white output, or a color output format.

5. The method of claim 1, wherein the respective weights are calculated based on user information which comprises at least one of a user identification, a user's department, a user's rank and a user's current project.

6. The method of claim 5, wherein the respective weights are calculated based on at least one of how soon the job request must be fulfilled and the user's information.

7. The method of claim 1, wherein the job request is fulfilled based on a fairness scheme that is a function of the number of jobs submitted by the user in a predefined time period, and the number of days left before the job will expire.

8. The method of claim 1, wherein when the job request fails, the user is notified and the job is automatically resubmitted within a predefined amount of time.

9. An apparatus, comprising:
    a processor configured to:
        apply respective weights for a plurality of information items to determine a job priority,
        concurrently determine a first pool of printers based on the respective weights and a second pool of printers without using the respective weights;
        determine a third pool of printers from the first pool of printers and the second pool of printers, the third pool of printers satisfying conditions of the first pool of printers and conditions of the second pool of printers; and
        select at least one appropriate device from the third pool of printers to fulfill a job request based on the respective weights and at least one available job specific resource; and
    a transmitter configured to transmit the job to the appropriate device, wherein the appropriate device processes and completes the job based on the respective weights;
    wherein the respective weights being applied for the plurality of information items to determine the job priority comprises a value of the collective weights of the plurality of information items being taken and the value being divided by a cumulative utility factor.

10. The apparatus of claim 9, wherein the at least one job specific resource comprises at least one of a printer type, an available printer and a printer's output format.

11. The apparatus of claim 10, wherein the printer type comprises a laser printer, a color printer, an ink-jet printer, or a color laser printer.

12. The apparatus of claim 10, wherein the respective weights are calculated based on user information which comprises at least one of a user identification, a user's department, a user's rank and a user's current project.

13. The apparatus of claim 12, wherein the respective weights are calculated based on at least one of how soon the job request must be fulfilled and the user's information.

14. The apparatus of claim 10, wherein the job request is fulfilled based on a fairness scheme that is a function of the number of jobs submitted by the user in a predefined time period, and the number of days left before the job will expire.

15. The apparatus of claim 10, wherein when the job request fails, the user is notified and the job is automatically resubmitted within a predefined amount of time.

16. A computer program, embodied on a non-transitory computer readable medium, the computer program configured to cause a processor to:
    applying respective weights for a plurality of information items to determine a job priority;
    concurrently determine a first pool of printers based on the respective weights and a second pool of printers without using the respective weights;
    determine a third pool of printers from the first pool of printers and the second pool of printers, the third pool of printers satisfying conditions of the first pool of printers and conditions of the second pool of printers;
    select at least one appropriate device from the third pool of printers to fulfill a job request based on the respective weights and at least one available job specific resource; and
    process and complete the job using the at least one appropriate device based on the respective weights;
    wherein the applying of the respective weights for the plurality of information items to determine the job priority comprises taking a value of the collective weights of the plurality of information items and dividing the value by a cumulative utility factor.

17. The computer program of claim 16, wherein the respective weights are calculated based on user information which comprises at least one of a user identification, a user's department, a user's rank and a user's current project.

18. The computer program of claim 17, wherein the respective weights are calculated based on at least one of how soon the job request must be fulfilled and the user's information.

19. The computer program of claim 16, wherein the job request is fulfilled based on a fairness scheme that is a function of the number of jobs submitted by the user in a predefined time period, and the number of days left before the job will expire.

20. The computer program of claim 16, wherein when the job request fails, the user is notified and the job is automatically resubmitted within a predefined amount of time.

* * * * *